(12) United States Patent
Eom

(10) Patent No.: US 12,182,389 B2
(45) Date of Patent: Dec. 31, 2024

(54) METHOD FOR PROCESSING TOUCH INPUT AND AN ELECTRONIC DEVICE THEREOF

(71) Applicant: Samsung Electronics Co., Ltd., Suwon-si (KR)

(72) Inventor: Junbong Eom, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/120,925

(22) Filed: Mar. 13, 2023

(65) Prior Publication Data

US 2023/0221853 A1   Jul. 13, 2023

Related U.S. Application Data

(63) Continuation of application No. PCT/KR2022/017946, filed on Nov. 15, 2022.

(30) Foreign Application Priority Data

Jan. 12, 2022   (KR) .................. 10-2022-0004508
Mar. 16, 2022   (KR) .................. 10-2022-0032803

(51) Int. Cl.
*G06F 3/048*   (2013.01)
*G06F 3/0354*   (2013.01)
(Continued)

(52) U.S. Cl.
CPC ........ *G06F 3/0485* (2013.01); *G06F 3/03547* (2013.01); *G06F 3/0383* (2013.01); *G06F 3/048* (2013.01)

(58) Field of Classification Search
None
See application file for complete search history.

(56) References Cited

U.S. PATENT DOCUMENTS 7,184,064 B2   2/2007   Zimmerman et al.
9,898,185 B2   2/2018   Kawamura et al.
(Continued)

FOREIGN PATENT DOCUMENTS

JP   2014119697 A   6/2014
JP   2015102924 A   6/2015
(Continued)

OTHER PUBLICATIONS

International Search Report with English Translation for International Application No. PCT/KR2022/017946; International Filing Date Nov. 15, 2022; Date of Mailing Mar. 2, 2022; 10 pages.

*Primary Examiner* — Xuyang Xia
(74) *Attorney, Agent, or Firm* — CANTOR COLBURN LLP

(57) ABSTRACT

A method for operating an electronic device is provided. Aspects include configuring a touch slop corresponding to a reference for performing a scroll in response to detection of a first touch event and acquiring touch information corresponding to a current touch point every predetermined time while the first touch event is maintained. Based on a determination that a touch movement distance exceeds the touch slop, based on the acquired touch information, aspects include initiating a scroll for a first screen displayed on the display module. Aspects further include identifying scroll data comprising at least one of a movement speed, a movement distance, and deceleration of the first touch event, based on the touch information acquired while the scroll is performed and determining whether to end the scroll, based on the scroll data to control a state of the scroll for the first screen.

18 Claims, 13 Drawing Sheets

(51) Int. Cl.
*G06F 3/038* (2013.01)
*G06F 3/0485* (2022.01)

(56) References Cited

U.S. PATENT DOCUMENTS

| | | | |
|---|---|---|---|
| 10,691,170 B2* | 6/2020 | Ökvist | G06F 3/0488 |
| 2009/0070710 A1* | 3/2009 | Kagaya | G06F 16/44 |
| | | | 715/810 |
| 2010/0169774 A1* | 7/2010 | Oda | G06F 3/0488 |
| | | | 715/702 |
| 2011/0025720 A1 | 2/2011 | Jo et al. | |
| 2013/0106744 A1* | 5/2013 | Asakura | G06F 3/04883 |
| | | | 345/173 |
| 2013/0222301 A1* | 8/2013 | Lee | G06F 3/0488 |
| | | | 345/173 |
| 2014/0372923 A1* | 12/2014 | Rossi | G06F 3/04845 |
| | | | 715/769 |
| 2016/0004403 A1* | 1/2016 | Lee | G06F 3/0488 |
| | | | 345/156 |
| 2016/0291794 A1* | 10/2016 | Kawamura | G06F 3/0418 |
| 2017/0131832 A1 | 5/2017 | Lee et al. | |
| 2019/0073104 A1* | 3/2019 | Wang | G06F 3/04883 |
| 2022/0035521 A1* | 2/2022 | Smochko | G06F 3/038 |

FOREIGN PATENT DOCUMENTS

| | | |
|---|---|---|
| JP | 2016197284 A | 11/2016 |
| JP | 2019074814 A | 5/2019 |
| JP | 6635883 B2 | 1/2020 |
| JP | 6956209 B2 | 11/2021 |
| JP | 6978047 B2 | 12/2021 |
| KR | 20040071767 A | 8/2004 |
| KR | 100971452 B1 | 7/2010 |
| KR | 20100113054 A | 10/2010 |
| KR | 20110011388 A | 2/2011 |
| KR | 20160019762 A | 2/2016 |
| KR | 101885131 B1 | 8/2018 |
| KR | 20200001709 A | 1/2020 |

* cited by examiner

METHOD FOR PROCESSING TOUCH INPUT AND AN ELECTRONIC DEVICE THEREOF

CROSS-REFERENCE TO RELATED APPLICATIONS

This application is a continuation application of International Application No. PCT/KR2022/017946 designating the United States, filed on Nov. 15, 2022, in the Korean Intellectual Property Receiving Office and claiming priority to Korean Patent Application No. 10-2022-0004508, filed on Jan. 12, 2022, and Korean Patent Application No. 10-2022-0032803, filed on Mar. 16, 2022, in the Korean Intellectual Property Office, the disclosures of which are incorporated by reference herein in their entireties.

BACKGROUND

Various embodiments of the disclosure relate to a method and an apparatus for processing a touch event input into an electronic device.

With the development of information communication technologies, the use of mobile electronic devices such as smartphones or tablet PCs has been generalized. The mobile electronic devices can be easily carried and may provide users with various useful functions such as an information input/output function and a data storage function as well as a call function. As functions of the electronic device are diversified, information provided through a display gradually increases. On the other hand, the size of the display included in the electronic device may be restricted due to high portability, and the user may identify information that is not displayed on the display by moving a screen through scrolling using a touch input.

SUMMARY

An electronic device according to an embodiment of the disclosure includes a display module, at least one processor operatively connected to the display module, and a memory operatively connected to the at least one processor, wherein the memory is configured to store instructions causing the at least one processor to, when executed, configure a touch slop corresponding to a reference for performing a scroll in response to detection of a first touch event, acquire touch information corresponding to a current touch point every predetermined time while the first touch event is maintained, based on a determination that a touch movement distance exceeds the touch slop, based on the acquired touch information, initiate a scroll for a first screen displayed on the display module, identify scroll data including at least one of a movement speed, a movement distance, or deceleration of the first touch event, based on the touch information acquired while the scroll is performed, and determine whether to end the scroll, based on the scroll data to control a state of the scroll for the first screen.

A method of operating an electronic device according to an embodiment of the disclosure includes configuring a touch slop corresponding to a reference for performing a scroll in response to detection of a first touch event, acquiring touch information corresponding to a current touch point every predetermined time while the first touch event is maintained, based on a determination that a touch movement distance exceeds the touch slop, based on the acquired touch information, performing control to initiate a scroll for a first screen displayed on the display module, identifying scroll data including at least one of a movement speed, a movement distance, or deceleration of the first touch event, based on the touch information acquired while the scroll is performed, and determining whether to end the scroll, based on the scroll data to control a state of the scroll for the first screen.

According to various embodiments of the disclosure, it is possible to prevent processing of an unnecessary touch event by predicting a user's intent while a scroll function is provided on the basis of a touch event. Further, according to various embodiments of the disclosure, it is possible to provide a more enhanced user experience and improved convenience by improving reactivity for a scroll function through learning of attributes of content in a point in which a touch event is detected and a touch pattern of the user.

In addition, various effects directly or indirectly detected through the disclosure can be provided.

DESCRIPTION OF DRAWINGS

In connection with description of drawings, the same or similar reference numerals may be used for the same or similar elements.

DETAILED DESCRIPTION

In general, in order to determine the start of a screen scroll according to a user touch input in the electronic device, whether the touch input escapes a predetermined range (for example, a touch slop) from a point at which the touch input is generated may be measured. When the touch slop is configured to be large, an initial scroll reaction may become slow. In contrast, when the touch slop is configured to be small, the electronic device may recognize that a touch input intended as a selection by the user as a scroll input, which may cause a malfunction. Once the user's touch input escapes the touch slop, the scroll may be continuously performed regardless of an intensity or a direction of the touch input. In order to improve the same, various schemes for correcting touch information related to a scroll function have been proposed, but merely handle a technology for determining whether the scroll is performed before the scroll starts. Further, when the electronic device provides the scroll function, information for predicting a user's intent while the scroll is performed is not sufficient, and thus there may be limit in implementing a reaction speed that meets the user's expectations.

Accordingly, in various embodiments of the disclosure, it is possible to reduce the generation of unnecessary power consumption and controlling a screen scroll operation as intended by the user by predetermining a user's intent on the basis of a user's touch input detected by the electronic device and preventing an operation that is not intended by the user.

The technical subjects pursued in embodiments of the disclosure may not be limited to the above mentioned technical subjects, and other technical subjects which are not mentioned may be clearly understood, through the following descriptions, by those skilled in the art of the disclosure.

Hereinafter, various embodiments of the disclosure are described with reference to the accompanying drawings. However, this does not limit various embodiments of the disclosure to the specific form, and it should be understood that various modifications, equivalent, and/or alternative of the disclosure are included.

Figure 1:
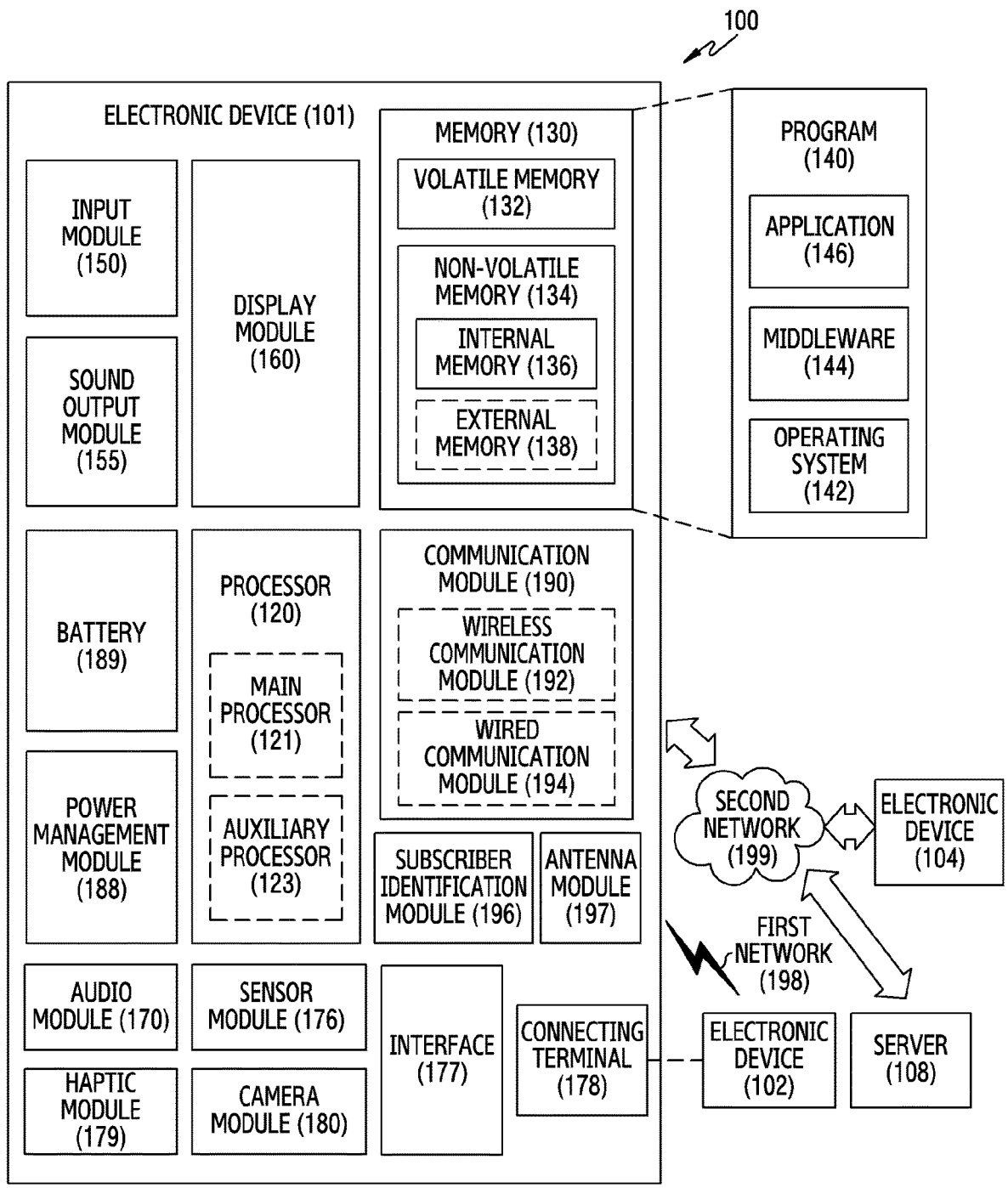
FIG. 1 is a block diagram illustrating an electronic device within a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
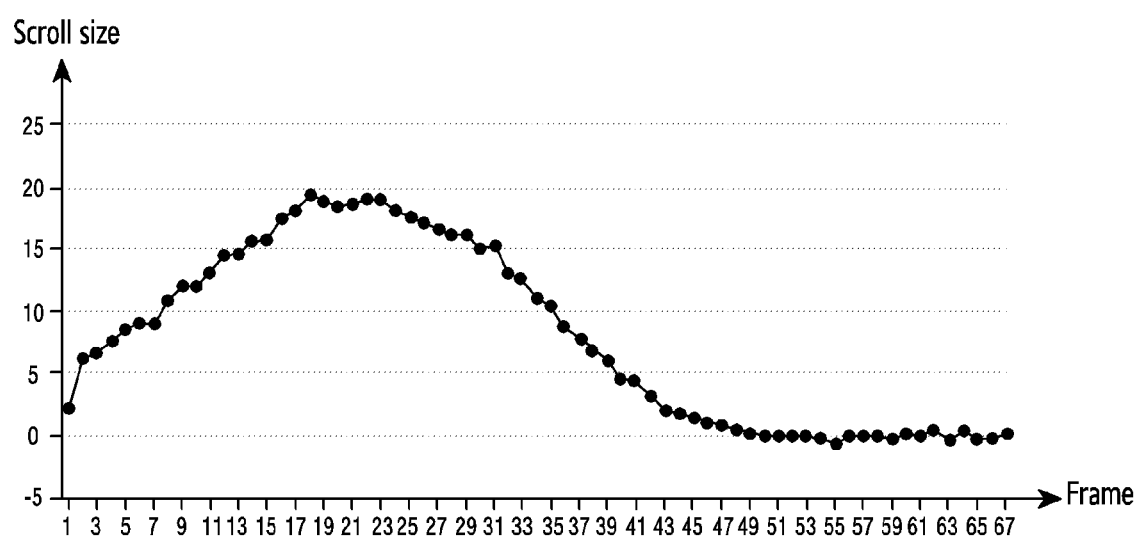
FIG. 2 illustrates a scroll processing scheme based on a touch movement distance according to an embodiment.

FIG. 2 illustrates a scroll processing scheme based on a touch movement distance according to an embodiment.

According to various embodiments, the electronic device 101 may provide a screen scroll function on the basis of touch information acquired (or received) according to a predetermined time period while a touch event is maintained after the touch event is generated.

Referring to FIG. 2, the electronic device 101 may acquire touch information according to a time period corresponding to a screen refresh rate of a display (for example, the display module 160 of FIG. 1) while the touch event is maintained. According to various embodiments, when the electronic device 101 includes a display having a screen refresh rate of 60 Hz, the touch information may be acquired in every 16 ms. The graph illustrated in FIG. 2 shows a scroll pattern generated in accordance with a touch input made from bottom to top of the display, and it may be observed that the screen scrolling is performed in accordance with a touch movement distance until the touch event is released after the touch event is generated. In FIG. 2, an x axis may indicate an elapse time of a frame provided through the display and a y axis may indicate the size of scrolling performed through the touch event.

In an embodiment, the electronic device 101 may generate the scroll for the screen provided through the display in accordance with the touch event. When detecting that the size of the scroll (for example, the touch movement distance) exceeds and escapes a predetermined value by a touch in the state in which the touch event is maintained after the touch event is generated, the electronic device 101 may initiate the scroll for the screen. The predetermined value may correspond to a touch slop having a minimum movement size that is a reference for generating the scroll. For example, in FIG. 2, the electronic device 101 may generate the scroll from a first frame having the measured touch movement size larger than the predetermined touch slop.

In an embodiment, the electronic device 101 may scroll the screen by the detected touch movement size in every frame unit time after the scroll is initiated. Accordingly, the electronic device 101 may have to process the scroll for the screen in spite of detection of a small change that the user cannot recognize. In FIG. 2, only a minute change and a change of movement opposite to an actual scroll direction may be detected from frame no. 47 to frame no. 67, but, when the electronic device 101 performs a scroll even for the change, the unnecessary use of processors and inefficient power consumption may be made. According to various embodiments, when touch release of the touch event is detected, the electronic device 101 may provide an animation effect such as fling, and fling animation that generates an additional scroll may be recognized as an unnecessary operation by the user who desires to stop the scroll. Accordingly, in order to increase scroll reactivity and improve efficiency of the processor during a screen scrolling process, the electronic device 101 needs to prevent the performance of an unnecessary operation by predicting a user's intent to stop (or end) the scroll on the basis of a touch movement size detected during the touch event.

Figure 3:
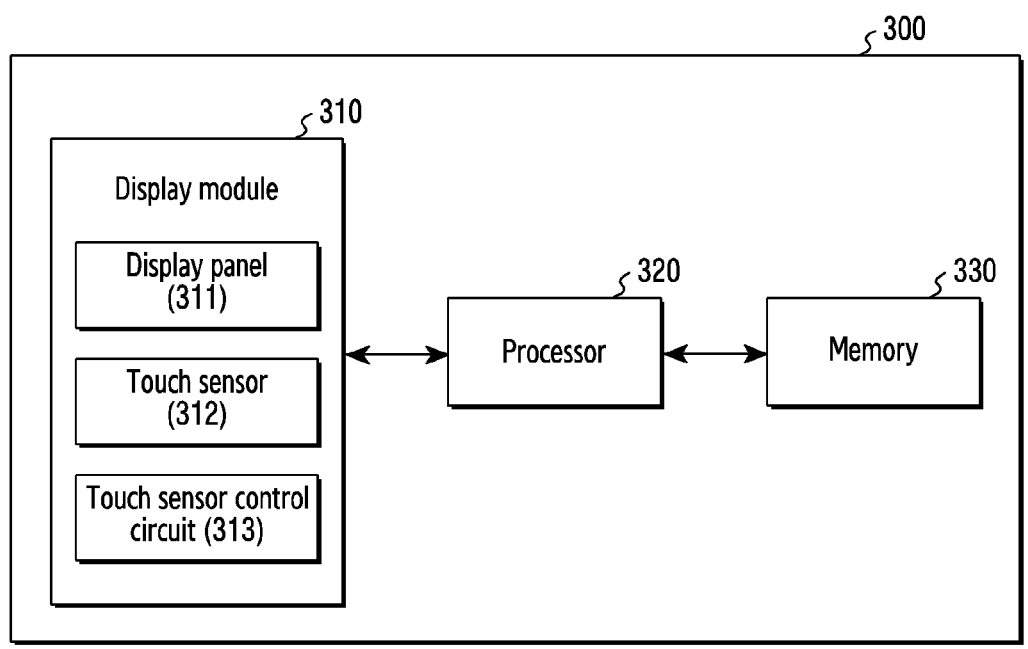
FIG. 3 illustrates a configuration of the electronic device according to an embodiment.

FIG. 3 illustrates a configuration of an electronic device 300 according to an embodiment.

Referring to FIG. 3, the electronic device 300 is a device for controlling s scroll state by determining in advance a user's intent on the basis of a touch event and may include a display module 310, at least one processor 320, or a memory 330. In FIG. 3, the electronic device 300 may correspond to the electronic device 101 illustrated in FIG. 1.

In an embodiment, the display module 310 (for example, the display module 160 of FIG. 1) may display a screen of a program (or an application) executed by the user and display the screen while moving the screen in an up and down direction or a left and right direction in response to the touch input detected during the displaying of the screen.

In an embodiment, the display module 310 may be configured by one or more of a liquid crystal display (LCD), a thin film transistor LCD (TFT-LCD), an organic light emitting diode (OLED), LED, active matrix OLED (AMO-LED), a flexible display, and a three-dimensional display. Some of the displays may be configured to be transparent or be a light-transmitting type so that the outside can be viewed therethrough. The display may be implemented in a transparent display type including transparent OLED (TOLED).

In an embodiment, the display module 310 may include a display panel 311, a touch sensor 312, and a touch sensor control circuit 313. The touch sensor control circuit 313 may identify data related to a user's touch input received on the display panel 311 through the touch sensor 312. For example, the touch sensor control circuit 313 may include a touch sensor panel integrated circuit (TSP IC) for identifying data on characteristics related to the user's touch input (for example, at least one of the location (coordinates) of the touch point, a touch area, a touch sensitivity, a movement distance, and/or a maintenance time). According to various embodiments, the touch sensor control circuit 313 may drive (for example, apply power to) the touch sensor and identify an electrical value (for example, at least one of a voltage value or a current value) or a change in the electrical value generated in the touch sensor by the input received on the basis of the applied power. The touch sensor control circuit 313 may determine a type of the touch (for example, a general touch, a drag touch, a palm touch, and/or a pinch) on the basis of the identified electrical value or change in the electrical value and transmit information thereon to at least one processor 320. The touch sensor control circuit 313 may transfer raw data on the touch event to at least one processor 320 so that the at least one processor 320 can process the touch input. According to various embodiments, the touch sensor 312 may include a touch sensor in at least one of a contact-type capacitive scheme, a pressure-type resistive scheme, an infrared detection scheme, a surface acoustic wave conductive scheme, and/or a piezo effect scheme, but is not limited to one thereof.

In an embodiment, the memory 330 (for example, the memory 130 of FIG. 1) may store instructions causing at least one processor 320 (for example, the processor 120 of FIG. 1) to, when executed, perform various operations. For example, at least one processor 320 may detect a touch event input by the user through the display module 310. The touch event is a touch gesture input by the user and may be divided into touch-down, touch-move, and touch-release operations. According to various embodiments, at least one processor 320 may recognize that the touch event is maintained until the touch is released after the touch down is generated and continuously identify a degree and a direction of the movement of the touch point while the touch event is maintained.

In an embodiment, at least one processor 320 may configure a touch slop corresponding to a minimum movement distance that is the reference for generating the scroll in response to detection of the touch event. At least one processor 320 may not generate the scroll until a touch movement larger than the touch slop is identified after the touch down of the touch event is detected. According to various embodiments, at least one processor 320 may configure the touch slop as various values according to the location at which the touch down is detected on the display panel 311 of the display module 310. For example, at least one processor 320 may identify whether the touch down point of the touch event corresponds to a selection input area within a first screen displayed through the display panel 311 and configure the touch slop on the basis of the identification result. The selection input area may be an area including an object configured as a touch listener or a press listener, or elements which can be selected by the user such as an image, a video clip, an anchor, and a form within the first screen. When the touch down point corresponds to the object or the element which can be selected by the user or when a parent element of the element selected by the touch down corresponds to the object or the element which can be selected by the user, at least one processor 320 may identify that the touch down point corresponds to the selection input area. When the touch down point does not correspond to the selection input area within the first screen, there is no selectable element in the touch down point, and thus at least one processor 320 may configure the touch slop as zero and process direct initiation of the scroll without identifying the touch slop. Based on a determination that the touch down point corresponds to the selection input area within the first screen, at least one processor 320 may configure the touch slop as a value larger than zero and identify whether a touch movement detected thereafter is an input for the scroll or an input for selecting a specific element. In this case, when the detected touch movement distance is shorter than the configured touch slop, at least one processor 320 may determine that the touch movement is the input for selecting the specific element. On the other hand, when the detected touch movement distance is longer than the configured touch slop, at least one processor 320 may determine that the touch movement is the scroll input and perform the scroll according to the touch movement distance.

In another example, at least one processor 320 may identify whether the touch down point of the touch event corresponds to a scroll area on the basis of a scroll map having a defined scroll pattern of the user and configure the touch slop on the basis of the identification result. At least one processor 320 may store a scroll generation probability of each of a plurality of areas included in the display panel 311 and the scroll map that defines the scroll area in which the scroll is generated with a high probability in the memory 330 to manage them. The scroll map may be updated whenever a new touch event ends. When the touch down of the touch event is detected, at least one processor 320 may load the scroll map from the memory 330 and identify whether the scroll generation probability of the touch down point or the touch down point corresponds to the scroll area. Based on a determination that the touch down point corresponds to the scroll area, at least one processor 320 may configure the touch slop on the basis of the scroll generation probability of the touch down point. That is, at least one processor 320 may determine a constant K which is proportional to the scroll generation probability and configure the touch slop by dividing a default value of the touch slop by the determined constant K. Accordingly, as the scroll generation probability of the touch down point is higher, a value closer to zero may be configured as the touch slop. When the touch down point does not correspond to the scroll area, at least one processor 320 may determine whether to perform the scroll on the basis of the default value without any change in the configuration for the touch slop.

In an embodiment, at least one processor 320 may acquire (or receive) touch information related to the current touch point in every predetermined time while the touch event is maintained. The touch information may include at least one of coordinates of the point in which the touch is detected while the touch event is maintained, a movement speed or a movement distance calculated on the basis of the current touch point, or a deceleration. The predetermined time may correspond to a screen refresh rate of the display panel 311. For example, when the screen refresh rate of the display panel 311 is 60 Hz, at least one processor 320 may acquire the touch information every 16 ms. In another example, when the screen refresh rate of the display panel 311 is 120 Hz, at least one processor 320 may acquire the touch information every 8 ms. According to various embodiments, at least some operations controlled by at least one processor 320 in the disclosure may be performed by the touch sensor control circuit 313 included in the display module 310. For example, the touch sensor control circuit 313 may detect a touch event input into the display panel 311 and acquire touch information corresponding to a time period corresponding to the screen refresh rate of the display panel 311 while the touch event is maintained. In another example, the touch sensor control circuit 313 may configure the touch slop that is the reference for determining whether the scroll is generated in connection with the touch event.

In an embodiment, at least one processor 320 may identify whether the touch movement distance exceeds the configured touch slot on the basis of the acquired (or received) touch information. When the touch movement distance does not exceed the touch slop on the basis of the identification result, at least one processor 320 may not perform the scroll of the first screen until the touch movement exceeding the touch slop is detected. When the touch movement distance exceeds the touch slop on the basis of the identification result, at least one processor 320 may control the display module 310 to initiate the scroll for the first screen in response to the touch movement.

According to various embodiments, at least one processor 320 may identify whether to check the touch slop whenever new touch information is acquired from a time point at which the touch down of the touch event is detected to a time point at which the touch is released. The check of the touch slop may be configured as a value of true or false. For example, based on a determination that the touch slop check item is configured as true, at least one processor 320 may determine whether the touch movement distance identified at the corresponding time point exceeds the configured touch slop. In another example, based on a determination that the touch slop check item is configured as false, at least one processor 320 may determine to perform the scroll without identifying the touch slop for the touch movement identified at the corresponding time point. In an embodiment, at least one processor 320 may configure an initial value (default value) of the touch slop check item as true. At least one processor 320 may identify whether the initially identified touch movement after the generation of the touch event exceeds the touch slop according to the initial configuration of the touch slop check item. At least one processor 320 may change the configuration value of the touch slop check item according to a scroll state of the touch event and determine whether to check the touch slop according to a previous configuration value of the touch slop check item while the scroll is performed.

In an embodiment, at least one processor 320 may identify scroll data including at least one of the movement speed, the movement distance, or the deceleration of the touch event on the basis of the touch information acquired while the scroll for the first screen is performed. For example, at least one processor 320 may acquire coordinate information of points in which the touch movements are detected every predetermined time while the scroll is performed and calculate at least one of the movement speed, the movement distance, or the deceleration for each scroll interval on the basis of the acquired coordinate information. The scroll interval may correspond to the predetermined time that is a time period during which the touch information is acquired.

In an embodiment, at least one processor 320 may determine whether to end the scroll on the basis of the scroll data. For example, at least one processor 320 may identify the movement distance of the scroll interval corresponding to the current touch movement point on the basis of the scroll data and compare the identified movement distance with a first threshold value. The first threshold value may indicate a minimum touch movement size for continuing the scroll. When the identified movement distance is shorter than the first threshold value on the basis of the comparison result, at least one processor 320 may additionally identify whether the state of the scroll is changed. At least one processor 320 may identify a first scroll interval having the longest touch movement distance while the scroll for the first screen is performed on the basis of the touch information and calculate deceleration at the current touch movement point on the basis of the first scroll interval. At least one processor 320 may identify a user's intent about whether to continue the scroll through a comparison operation between the calculated deceleration and a second threshold value. The second threshold value may indicate a deceleration value defined on the basis of the reference for determining a scroll stop interval. When the calculated deceleration is larger than the second threshold value on the basis of the comparison result, at least one processor 320 may determine that the user has an intent to stop the scroll and control the display module 310 to stop the scroll for the first screen.

According to various embodiments, at least one processor 320 may determine a user's intent on the basis of the touch movement distance measured in scroll intervals without any measurement of deceleration in a low-speed scroll condition. When the user slowly performs touch movement and scroll, a difference in the touch movement distance between the first scroll interval and another scroll interval is not large, and thus the scroll may be frequently stopped. In order to prevent this, at least one processor 320 may count a scroll interval having the movement distance, which is identified on the basis of the touch information while the scroll for the first screen is performed, shorter than the first threshold value. Based on a determination that the number of counted scroll intervals is larger than a third threshold value, at least one processor 320 may determine that the user has an intent to stop the scroll and control the display module 310 to stop the scroll. The third threshold value is the reference number for determining the user's intent to stop the scroll and may be predefined. At least one processor 320 may additionally identify a scroll interval having the movement distance, which is identified while the scroll interval smaller than the first threshold value is counted, longer than the first threshold value. Based on a determination that the scroll interval larger than the first threshold value is larger than a fourth threshold value, at least one processor 320 may determine a user's intent to continue the scroll and reset the count as zero. The fourth threshold value is the reference number for determining the user's intent to continue the scroll and may be predefined.

According to various embodiments, at least one processor 320 may configure to at least temporarily lower the first threshold value in a low-speed scroll condition (or when the user's intent is determined without deceleration measurement). For example, at least one processor 320 may identify a movement speed for each scroll interval while the scroll for the first screen is performed and calculate an average speed at the current touch movement point on the basis of the identified movement speed. Based on a determination that the calculated average speed is lower than or equal to a predetermined speed, at least one processor 320 may configure the first threshold value to be smaller than a predetermined value.

In an embodiment, when touch release of the touch event is detected, at least one processor 320 may identify a scroll state for the first screen. For example, when the touch release is detected in the state in which the scroll for the first screen is performed, at least one processor 320 may determine a generation speed of an animation effect (for example, fling) to be applied right before the end of the scroll on the basis of the recent scroll speed (for example, an average movement speed of a predetermined number of scroll intervals based on the touch release time point). In another example, when the touch release is detected in the state in which the scroll for the first screen is stopped, at least one processor 320 may determine that the user has the intent to stop the scroll for the first screen. In this case, at least one processor 320 may determine the generation speed of the animation effect as zero and process the end of the touch event in the state in which the scroll is stopped immediately without the application of the animation effect to the scroll. At least one processor 320 may immediately control the scroll state according to the user's intent without processing an unnecessary operation during the scroll process corresponding to the touch event, thereby improving the process efficiency and the response speed during the scroll process.

Figure 4:
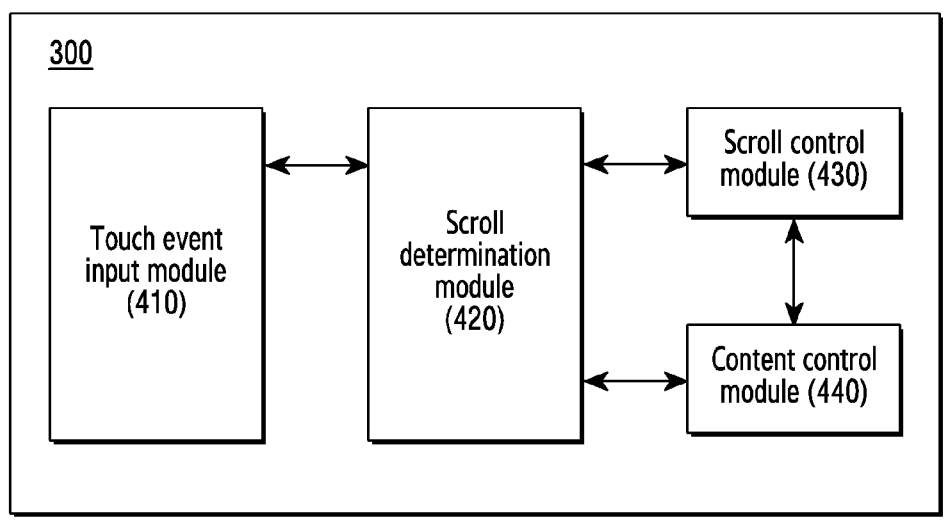
FIG. 4 illustrates a detailed configuration of the electronic device according to an embodiment.

FIG. 4 illustrates a detailed configuration of the electronic device 300 according to an embodiment. The function described with reference to FIG. 4 may be understood as the function performed by at least one processor 320 (for example, application processor) of the electronic device 300 of FIG. 3 and/or the touch sensor control circuit 313 (for example, touch integrated circuit (IC) included in the display module 310. For example, a touch event input module 410, a scroll determination module 420, a scroll control module 430, or a content control module 440 illustrated in FIG. 4 may be implemented as a software module including at least one command. At least one processor 320 may execute commands (for example, instructions) stored in the memory 330 in order to implement the software modules illustrated in FIG. 4 and control hardware related to functions (for example, the display module 310 or the memory 330 of FIG. 3). According to various embodiments, the electronic device 300 is not limited to the elements illustrated in FIG. 4, and may additionally include elements corresponding to functions required by the electronic device 300 among the elements illustrated in FIG. 1.

Referring to FIG. 4, the electronic device 300 may include the touch event input module 410, the scroll determination module 420, the scroll control module 430, or the content control module 440.

In an embodiment, the touch event input module 410 may detect a touch event input into the display panel 311 included in the display module (for example, the display module 160 of FIG. 1 or the display module 310 of FIG. 3) and determine an operation type of the touch event. For example, the touch event may be divided into touch down, touch move, or touch release operations. The touch event input module 410 may determine that the touch event is generated at a time point at which the touch down is detected on the display panel 311 and determine that the touch event ends at a time point at which the touch release is detected on the display panel 311. The touch event input module 410 may determine that, as the touch movement, the movement of a touch point identified while the touch event is maintained in the state in which the touch is held from the time point at which the touch down is detected to the time point at which the touch release is detected.

In an embodiment, the scroll determination module 420 may configure a condition for performing the scroll while the touch event is maintained and make a decision related to the condition. For example, the scroll determination module 420 may configure a touch slop which is the reference for generating the scroll during the touch event. In another example, the scroll determination module 420 may identify a touch movement distance at the current touch point on the basis of touch information acquired every predetermined time while the touch event is maintained and determine whether the identified touch movement distance is longer than the predetermined touch slop. In another example, the scroll determination module 420 may determine whether to check the touch slop whenever the touch information is acquired. The check of the touch slop indicates whether to determine whether the acquired touch information exceeds the touch slop and may be configured as a value of true or false according to a scroll state. When the touch slop check item is configured as true, the scroll determination module 420 may identify whether touch information at the corresponding time point exceeds the touch slop and determine whether to initiate the scroll on the basis of the identification result. When the touch slop check item is configured as false, the scroll determination module 420 may determine whether to continue the scroll without identifying whether the touch information at the corresponding time point exceeds the touch slop.

In an embodiment, the scroll control module 430 may control the scroll state for the first screen which is being output through the display panel 311 and identify a user's intent during the scroll. For example, based on a determination that the touch movement distance identified at the current touch point exceeds the touch slop on the basis of the determination result of the scroll determination module 420, the scroll control module 430 may initiate the scroll for the first screen. In another example, the scroll control module 430 may identify the user's intent to stop or continue the scroll on the basis of touch information acquired during the scroll for the first screen and control the scroll state according to the identification result.

In an embodiment, the content control module 440 may determine content of the first screen displayed on the display panel while the touch event is maintained. For example, the content control module 440 may identify whether a touch down point of the touch event corresponds to a selection input area within the first screen. The selection input area may be an area including an object configured as a touch listener (or a listener associated with a user input) (for example, including a click listener or a press listener), or elements which can be selected by the user such as an image, a video clip, an anchor, and a form within the first screen. In another example, the content control module 440 may update and control the state of the display module 310 to display the first screen according to the scroll state controlled by the scroll control module 430.

Figure 5:
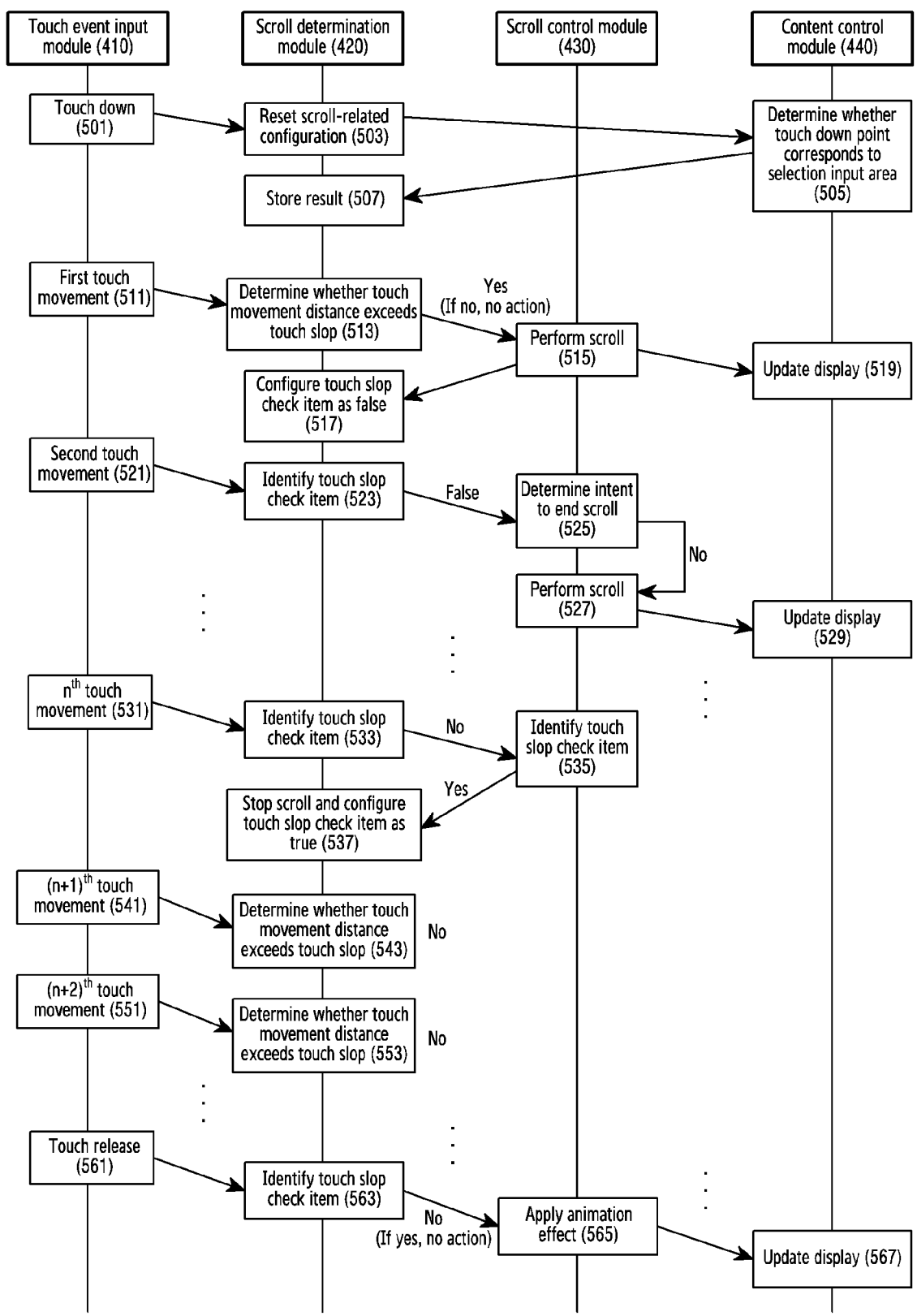
FIG. 5 illustrates a scheme for controlling a scroll state in accordance with a touch event input into the electronic device according to an embodiment.

A detailed description of the operations or functions of the elements illustrated in FIG. 4 is made with reference to FIG. 5.

Referring to FIG. 5, in operation 501, the touch event input module 410 may detect the generation of touch down while the first screen is displayed through the display module 310. The touch event input module 410 may determine that a new touch event is generated on the basis of the touch down and continuously identify a touch point until the touch is released after the touch down is generated.

According to an embodiment, in operation 503, the scroll determination module 420 may reset a scroll determination-related configuration in response to the generation of the new touch event. For example, the scroll determination module 420 may configure, as an initial state, a touch slop check item indicating a touch slop that is the reference for determining whether to initiate the scroll during the touch event and/or a determination of whether touch information acquired during the touch event exceeds the touch slop. For example, the scroll determination module 420 may configure the touch slop as a predetermined default value and configure the touch slop check item as true in operation 503.

According to an embodiment, in operation 505, the content control module 440 may identify whether the touch down point corresponds to the selection input area within the first screen. The content control module 440 may determine an area including an object configured as a touch listener and/or an element which can be selected by the user as the selection input area within the first screen. For example, based on a determination that the object or the selectable element is arranged in the touch down point within the first screen, the content control module 440 may identify that the touch down point corresponds to the selection input area. In another example, based on a determination that a parent element of the element selected by the touch down in the first screen corresponds to the object or the selectable element, the content control module 440 may identify that the touch down point corresponds to the selection input area.

According to an embodiment, in operation 507, the scroll determination module 420 may store the identification result of operation 505. For example, when the touch down point does not correspond to the selection input area on the basis of the identification result, the scroll determination module 420 may configure an item for checking whether the touch downlink point corresponds to the selection input area as false and configure the touch slop as zero. When the touch down point corresponds to the selection input area on the basis of the identification result, the scroll determination module 420 may configure the item for checking whether the touch downlink point corresponds to the selection input area as true and configure the touch slop as a value larger than zero.

According to an embodiment, in operation 511, the event input module 410 may detect a first touch movement of the touch event. According to various embodiments, the event input module 410 may detect the touch movement on the basis of touch information acquired every predetermined time while the touch event is maintained. The touch information may include at least one of coordinates of the point in which the touch is detected while the touch event is maintained, a movement speed or a movement distance calculated on the basis of the current touch point, or a deceleration. The predetermined time may correspond to a screen refresh rate of the display panel 311. For example, when the screen refresh rate of the display panel 311 is 60 Hz, at least one processor 320 may acquire touch information related to the touch event.

According to an embodiment, in operation 513, the scroll determination module 420 may identify that a touch slop check item for the touch event is configured as true and identify whether a movement distance by the first touch movement exceeds the configured touch slop. When the movement distance by the first touch movement exceeds the touch slop on the basis of the identification result, the scroll control module 430 may initiate the scroll for the first screen in operation 515. When the movement distance by the first touch movement does not exceed the touch slop on the basis of the identification result, the scroll control module 430 may perform no operation until the following touch movement exceeding the touch slop is detected.

According to an embodiment, when the scroll for the first screen is generated by the scroll control module 430, the scroll determination module 420 may change the configuration of the touch slop check item as false in operation 517. The scroll determination module 420 may determine to perform the scroll without identifying whether the detected touch movement exceeds the touch slop while the touch slop check item is configured as false. In response to the generation of the scroll for the first screen, the content control module 440 may update the state of the display module 310 to display the first screen scrolled according to the first touch movement in operation 519.

According to an embodiment, in operation 521, the event input module 410 may detect a second touch movement of the touch event. In response to the detection of the second touch movement, the scroll determination module 420 may identify that the touch slop check item for the touch event is configured as false in operation 523. When the touch slop check item is configured as false, the scroll determination module 420 may recognize that the scroll for the first screen is being performed at a time point at which the second touch movement is detected and omit the identification of the touch slop for the touch movement.

According to an embodiment, in operation 525, the scroll control module 430 may determine whether the user has an intent to end the scroll while the scroll is performed on the first screen. For example, the scroll control module 430 may identify at least one of a movement speed, a movement distance, or deceleration in the corresponding scroll interval on the basis of touch information acquired at a time point at which the touch movement is detected. When the movement distance identified for the scroll interval is shorter than a first threshold value and deceleration calculated in the scroll interval is larger than a second threshold value, the scroll control module 430 may determine that the user has an intent to end the scroll. The first threshold value may indicate the minimum touch movement size to continue the scroll, and the second threshold value may indicate a deceleration value defined as the reference for determining a scroll stop interval. The deceleration of the scroll interval may be calculated on the basis of a scroll interval having the longest touch movement distance while the scroll for the first screen is performed. When at least one of the determination conditions for the first threshold value and the second threshold is not satisfied, the scroll control module 430 may determine that the user has an intent to continue the scroll. In another example, when the first screen is slowly scrolled at a speed lower than a predetermined speed, the scroll control module 430 may determine the user's intent to end the scroll on the basis of a touch movement distance for each scroll interval measured until the time point at which the touch movement is detected. In this case, the scroll control module 430 may count a scroll interval having the touch movement distance shorter than the first threshold value and, when the number of counted scroll intervals is larger than a threshold value, determine that the user has the intent to end the scroll. Based on a determination that the scroll intervals having the touch movement distance longer than the first threshold value are larger than a fourth threshold value during the count process, the scroll control module 430 may reset the count as zero and count over again touch movements detected thereafter. The third threshold value may be a value configured as the reference number for determining the user's intent to end the scroll, and the fourth threshold value may be a value configured as the reference number for determining the user's intent to continue the scroll. When the determination condition for the third threshold value is not satisfied, the scroll control module 430 may determine that the user has the intent to continue to the scroll.

According to an embodiment, when the user's intent to end the scroll is not identified on the basis of the identification result of operation 525, the scroll control module 430 may determine to continue the scroll for the first screen in operation 527. Further, the content control module 440 may update the state of the display module 310 to display the first screen scrolled according to the second touch movement in operation 529.

According to an embodiment, in operation 531, the touch event input module 410 may detect an $n^{th}$ touch movement of the touch event. In response to the detection of the $n^{th}$ touch movement, the scroll determination module 420 may identify that the touch slop check item for the touch event is configured as false and omit the identification of the touch slop for the touch movement in operation 533.

According to an embodiment, in operation 535, the scroll control module 430 may determine whether the user has an intent to end the scroll while the scroll is performed on the first screen. In operation 535, the determination of the user's intent may be performed in the same way as operation 525.

According to an embodiment, when the user's intent to end the scroll is identified on the basis of the determination result of operation 535, the scroll determination module 420 may determine to stop the scroll for the first screen and change the configuration value of the touch slop check item to true. The scroll determination module 420 may reconfigure the touch slop as a predetermined default value in response to the change in the state of the scroll.

According to an embodiment, in operation 541, the touch event input module 410 may detect an $(n+1)^{th}$ touch movement of the touch event. In response to the detection of the $(n+1)^{th}$ touch movement, the scroll determination module 420 may identify that a touch slop check item for the touch event is configured as true and identify whether a movement distance by the $(n+1)^{th}$ touch movement exceeds the configured touch slop in operation 543. In operation 543, the scroll control module 430 may identify that the movement distance by the $(n+1)^{th}$ touch movement does not exceed the touch slop and determine not to perform an operation corresponding to the $(n+1)^{th}$ touch movement in the state in which the scroll for the first screen is stopped.

According to an embodiment, in operation 551, the touch event input module 410 may detect an $(n+2)^{th}$ touch movement of the touch event. In response to the detection of the $(n+2)^{th}$ touch movement, the scroll determination module 420 may identify that a touch slop check item for the touch event is configured as true and identify whether a movement distance by the $(n+2)^{th}$ touch movement exceeds the configured touch slop in operation 553. The scroll control module 430 may identify that the movement distance by the $(n+2)^{th}$ touch movement does not exceed the touch slop and determine not to perform an operation corresponding to the $(n+2)^{th}$ touch movement.

According to an embodiment, in operation 561, the touch event input module 410 may detect touch release. The touch event input module 410 may determine that the touch event ends on the basis of the detected touch release.

According to an embodiment, in operation 563, the scroll determination module 420 may identify the touch slop check item for the touch event in response to the detection of the touch release. For example, when the touch slop check item is configured as true, the scroll determination module 420 may identify that the scroll for the first screen is stopped and process the touch event to end immediately without any additional operation. In another example, when the touch slop check item is configured as false, the scroll determination module 420 may identify that the scroll for the first screen is being performed. In this case, the scroll control module 430 may apply an animation effect (for example, fling) to the scroll right before the touch event ends in operation 565. The scroll control module 430 may configure a generation speed of the animation effect on the basis of a recent speed of the scroll (for example, an average movement speed of a predetermined number of scroll intervals based on the touch release time point). According to an embodiment, the content control module 440 may update the state of the display module 310 to gradually stop the scroll for the first screen on the basis of the configuration in response to the touch release in operation 567.

Figure 6:
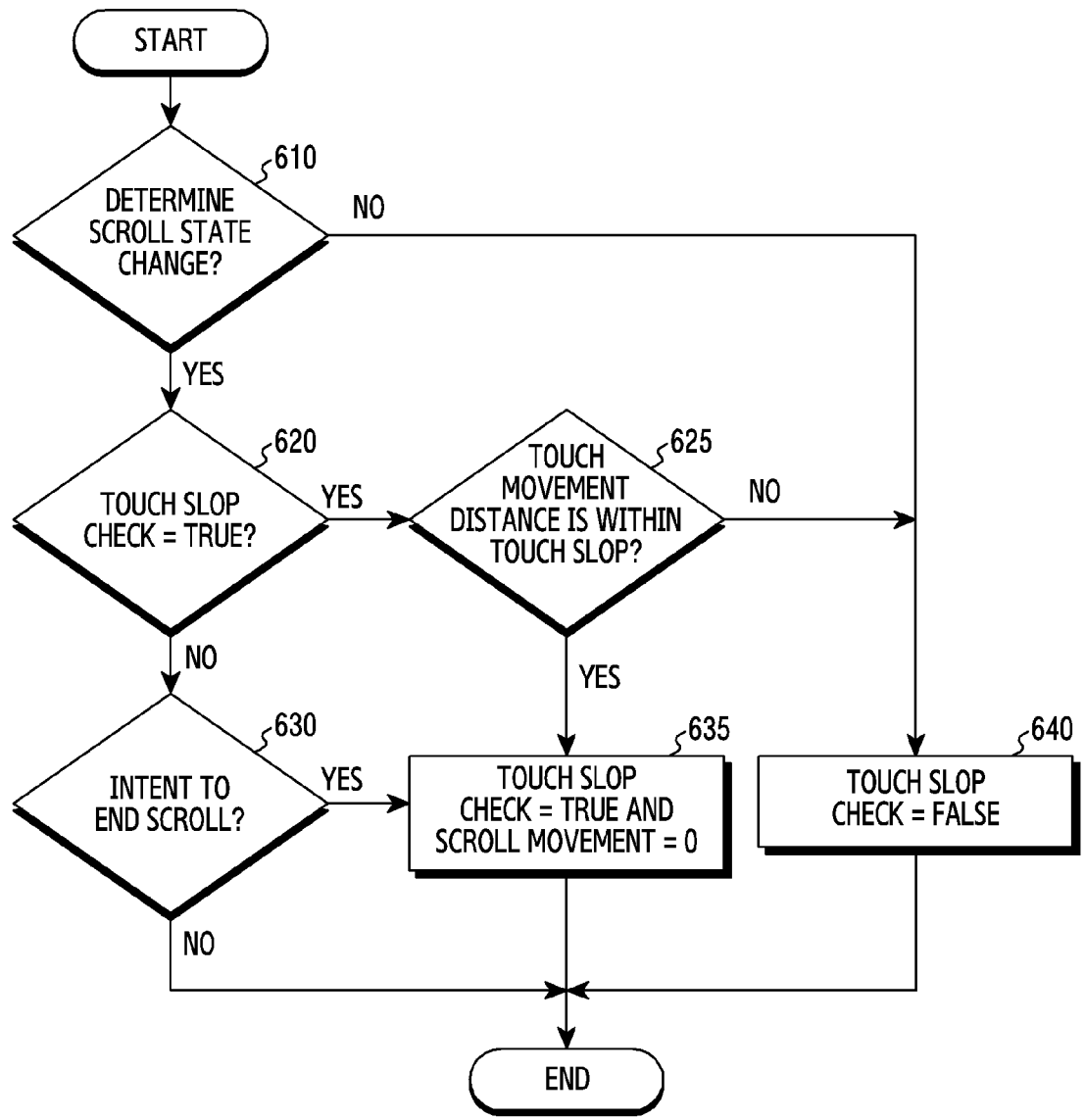
FIG. 6 illustrates a flowchart of a method for determining a user's intent to end the scroll while the touch event is maintained according to an embodiment.

FIG. 6 illustrates a scheme for determining a user's intent to end the scroll while the touch event is maintained according to an embodiment. According to various embodiments, the electronic device 300 may determine a user's intent to end the scroll on the basis of information related to a touch movement detected through a display module (for example, the display module 160 of FIG. 1 or the display module 310 of FIG. 3). The operations illustrated in FIG. 6 may correspond to the operations (for example, operations 511 to 533 in FIG. 4) performed for the touch movement detected every predetermined time while the touch event is maintained. The operations of FIG. 6 may be performed by at least one processor (for example, the processor 120 of FIG. 1, at least one processor 320 of FIG. 3, or a touch sensor control circuit (the touch sensor control circuit 313 of FIG. 3) and/or modules (for example, the scroll determination module 420 and/or the scroll control module 430) included in the electronic device 300 of FIG. 4).

Referring to FIG. 6, in operation 610, the electronic device 300 may identify whether there is a need to determine a scroll state change while a first screen is displayed through the display module 310. For example, when a new touch movement is detected on the basis of touch information acquired every predetermined time while the touch event is maintained, the electronic device 300 may recognize that there is the need to determine the scroll state change.

When there is the need to determine the scroll state change on the basis of the identification result of operation 610 (Yes of operation 610), the electronic device 300 may identify whether a touch slop check item is configured as true in operation 620. The touch slop check item may indicate whether it is determined whether the acquired touch information exceeds the touch slop. When the touch slop check item is configured as true on the basis of the identification result of operation 620 (Yes of operation 620), the electronic device 300 may identify whether a movement distance of an interval corresponding to a point in which the touch movement is detected is within the touch slop in operation 625. The touch slop may be a value configured as a minimum movement distance that is the reference for generating the scroll for the first screen. When the movement distance is within the touch slop on the basis of the identification result of operation 625 (Yes of operation 625), the electronic device 300 may configure the touch slop check item as true and configure the scroll movement value as zero to prevent the scroll for the first screen in operation 635. When the movement distance exceeds the touch slop on the basis of the identification result of operation 625 (No of operation 625), the electronic device 300 may initiate the scroll for the first screen and configure the touch slop check item as false in operation 640.

When the touch slop check item is configured as false on the basis of the identification result of operation 620 (No of operation 620), the electronic device 300 may recognize that the scroll for the first screen is being performed and omit the identification of the touch slop for the touch movement in operation 630. In operation 630, the electronic device 300 may identify whether the user has an intent to end the scroll on the basis of the touch movement.

According to an embodiment, the electronic device 300 may identify at least one of a movement sped, a movement distance, or deceleration in the corresponding scroll interval on the basis of touch information acquired at a time point at which the touch movement is detected in operation 630. For example, the electronic device 300 may acquire coordinate information of points in which the touch movements are detected in every predetermined time while the scroll for the first screen is performed and calculate at least one of the movement speed, the movement distance, or the deceleration for each scroll interval on the basis of the acquired coordinate information. For example, when the touch information is acquired every 16 ms, the electronic device 300 may identify coordinate information of points {(10, 10), (10, 20), (10, 40), (10, 60), (10, 90), (10, 100), (10, 102), (10, 103), (10, 103), (10, 101)} in which the 10 touch movements are detected. The coordinate information may be absolute coordinates defined on the display panel 311 included in the display module 310. In this case, coordinate information of the current touch point may be the most recently measured coordinate (10, 101) and a difference between the coordinates may correspond to a movement speed (an amount of scroll) for each scroll interval. The electronic device 300 may calculate movement speeds {(0, 10), (0, 20), (0, 20), (0, 30), (0, 10), (0, 2), (0, 1), (0, 0), (0, −2)} for respective scroll intervals on the basis of the coordinate information. In the coordinate information, the electronic device 300 may identify that a movement distance in a fifth touch movement is the longest and a movement speed in a scroll interval corresponding to the fifth touch movement is (0, 30) on the basis of the calculation result. According to various embodiments, when it is desired to calculate deceleration in a point in which an eighth touch movement is detected, the electronic device 300 may identify that a movement speed in a scroll interval corresponding to the corresponding point is (0, 1) and calculate deceleration of the corresponding scroll interval as shown in [Equation 1] below.

$$\text{deceleration} = \frac{30-1}{(16*3)} = 0.604 \qquad \text{[Equation 1]}$$

At this time, when it is assumed that the first threshold indicating the minimum touch movement speed to continue the scroll is configured as 2.1 and the second threshold value indicating the deceleration value defined as the reference for determining the scroll stop interval is configured as 0.5, the electronic device 300 may determine that there is an intent to stop the scroll from a point (10, 102) in which a seventh touch movement is detected.

According to another embodiment, when the user slowly performs touch movement at a speed lower than a predetermined speed, the electronic device 300 may determine the intent to end the scroll on the basis of touch movement speeds measured in scroll intervals without any calculation of the deceleration value in operation 630. For example, when the touch information is acquired every 16 ms, the electronic device 300 may identify coordinate information of points {(10, 9), (10, 13), (10, 16), (10, 18), (10, 21), (10, 24), (10, 28), (10, 32), (10, 36), (10, 40)} in which 10 touch movements are detected. The electronic device 300 may calculate movement speeds {(0, 4), (0, 3), (0, 2), (0, 3), (0, 3), (0, 4), (0, 4), (0, 4), (0, 4)} for respective scroll intervals on the basis of the coordinate information. In this case, since a movement speed difference between the scroll interval in which the maximum movement speed is measured and other scroll intervals is not large, it is unreasonable to determine the user's intent to stop the scroll on the basis of the deceleration calculation result. Accordingly, in the low-speed scroll, the electronic device 300 may count scroll intervals having the movement speed lower than the first threshold value and, when the number of counted scroll intervals is larger than the third threshold value, determine that the user has the intent to stop the scroll. The third threshold value is the reference number for determining the user's intent to stop the scroll and may be predefined. The electronic device 300 may additionally identify scroll intervals having the movement speed higher than the first threshold value while the scroll intervals having the movement speed lower than the first threshold value are counted and, based on a determination that the identified scroll intervals exceed the fourth threshold value, reset the count as zero and perform the count over again for the touch movements detected thereafter. The fourth threshold value is the reference number for determining the user's intent to continue to perform the scroll and may be predefined.

When there is the intent to end the scroll on the basis of the identification result of operation 630 (Yes of operation 630), the electronic device 300 may configure the touch slop check item as true and configure the scroll movement value as zero to prevent the generation of the scroll for the first screen in operation 635.

When there is no intent to end the scroll on the basis of the identification result of operation 630 (No of operation 630), the electronic device 300 may determine to continue the scroll for the first screen. In this case, the touch slop check item may be maintained as a preset false value.

When there is no need to determine the scroll state change on the basis of the identification result of operation 610 (No of operation 610), the electronic device 300 may determine to continue the scroll for the first screen and configure the touch slop check item as false in operation 640.

Figure 7:
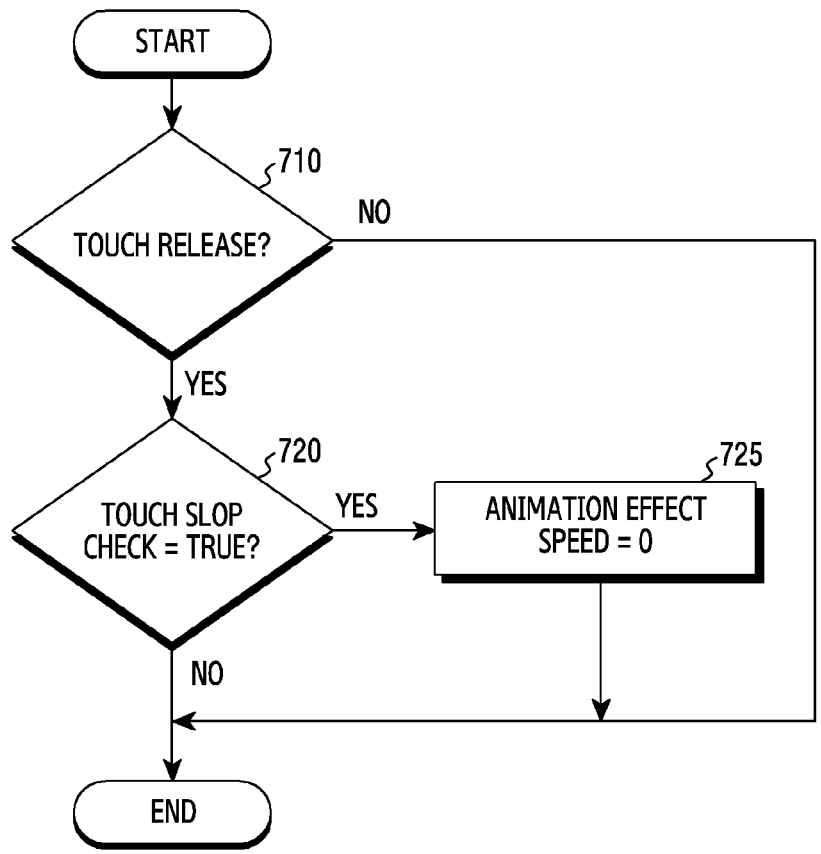
FIG. 7 illustrates a flowchart of a method for deactivating the animation effect when the intent to end the scroll is detected according to an embodiment.

FIG. 7 illustrates a scheme for deactivating the animation effect when the intent to end the scroll is detected according to an embodiment. According to various embodiments, the electronic device 300 may process the touch event to end without applying the animation effect (for example, fling) related to the scroll when the touch release is detected. The operations illustrated in FIG. 7 may correspond to the operations (for example, operations 511 to 565 in FIG. 4) related to the touch slop check determined for touch information acquired every predetermined time during the touch event. The operations of FIG. 7 may be performed by at least one processor (for example, the processor 120 of FIG. 1, at least one processor 320 of FIG. 3, or modules (for example, the scroll determination module 420 and/or the scroll control module 430) included in the electronic device 300 of FIG. 4). According to various embodiments, at least some of the operations illustrated in FIG. 7 may be performed by the touch sensor control circuit 313 included in the display module 310.

Referring to FIG. 7, in operation 710, the electronic device 300 may identify whether a type of touch information detected by the display module (for example, the display module 160 of FIG. 1 or the display module 310 of FIG. 3) is touch release.

When the touch information corresponds to the touch release on the basis of the identification result of operation 710 (Yes of operation 710), the electronic device 300 may identify whether the touch slop check item is configured as true in operation 720. The touch slop check item may indicate whether it is determined whether the acquired touch information exceeds the touch slop. When the touch slop check item is configured as true on the basis of the identification result of operation 720 (No of operation 720), the electronic device 300 may recognize that the user has no intent to stop the scroll for the first screen before the touch release and may not change the configuration related to the animation effect. In this case, the electronic device 300 may apply the animation effect of gradually stopping the scroll for the first screen according to the touch release, and a generation speed of the animation effect may be determined on the basis of a recent speed of the scroll (for example, an average movement speed of a predetermined number of scroll intervals based on a time point of the touch release).

When the touch slop check item is configured as true on the basis of the identification result of operation 720 (Yes of operation 720), the electronic device 300 may recognize that the user has no intent to stop the scroll for the first screen before the touch release and may change the configuration related to the animation effect in operation 725. In this case, the electronic device 300 may configure the generation speed of the animation effect as zero and process the touch event to end immediately without providing the animation effect related to the scroll in operation 725.

When the touch information does not correspond to the touch release on the basis of the identification result of operation 710 (No of operation 710), the electronic device 300 may identify that the touch information is related to the touch movement and end the determination of the animation effect related to the scroll provided when the touch release is performed.

Figure 8A:
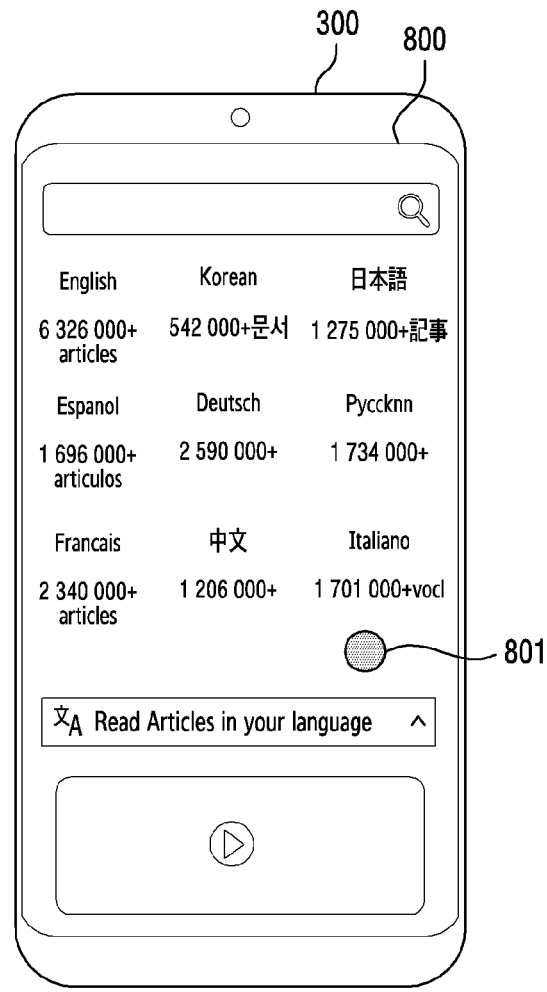
FIGS. 8A and 8B illustrate a scheme for processing the scroll on the basis of a touch down point of a touch event according to an embodiment.
Figure 8B:
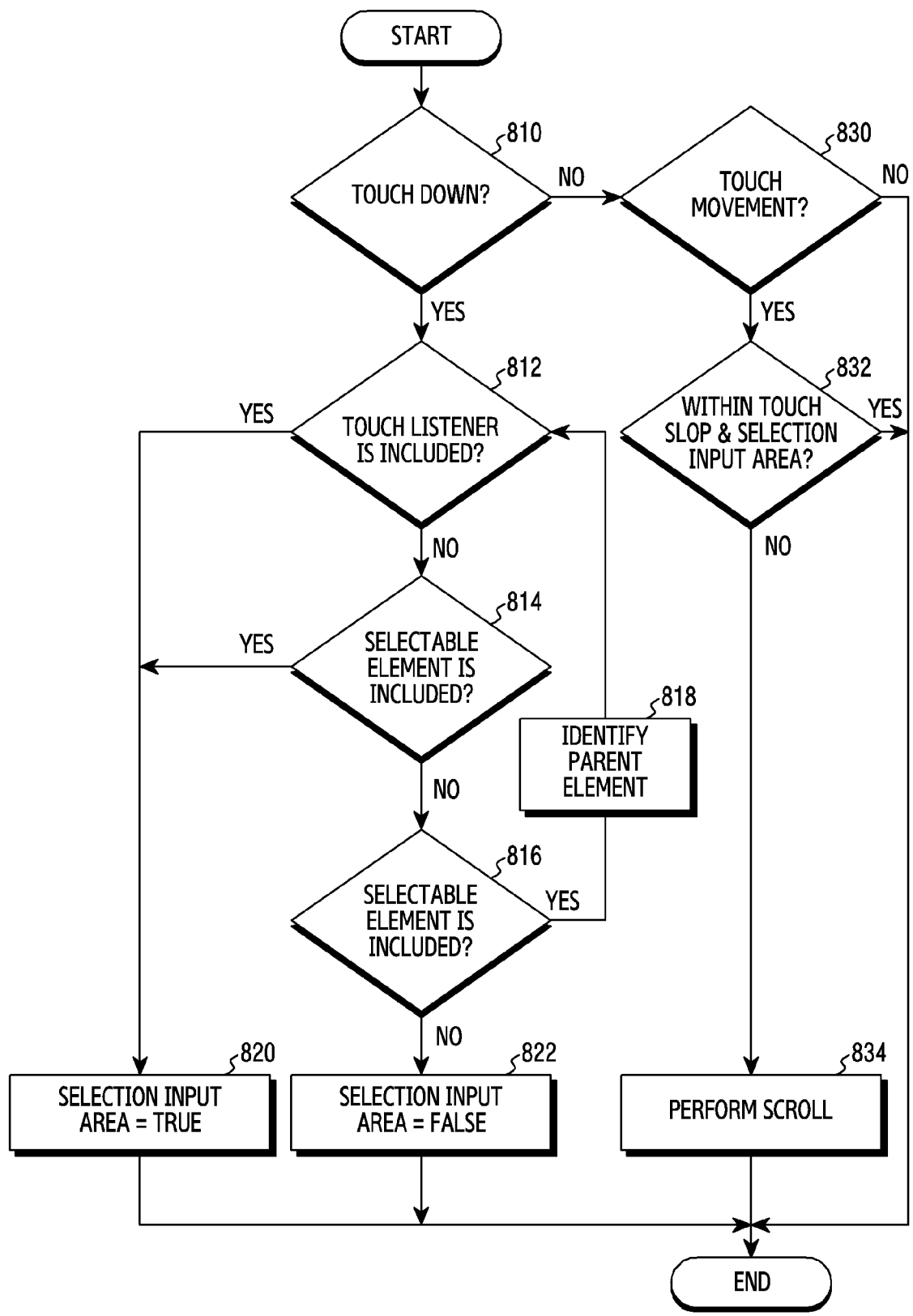

FIGS. 8A and 8B illustrate a scheme for processing the scroll on the basis of a touch down point of a touch event according to an embodiment.

In FIG. 8A, the electronic device 300 may identify whether a point in which touch down 801 is detected corresponds to a selection input area while a first screen 800 is displayed through a display module (for example, the display module 160 of FIG. 1 or the display module 310 of FIG. 3). Determination of the selection input area is described with reference to FIG. 8B. The operations of FIG. 8B may be performed by at least one processor (for example, the processor 120 of FIG. 1 or at least one processor 320 of FIG. 3), a touch sensor control circuit (for example, the touch sensor control circuit 313 of FIG. 3), and/or modules (for example, the touch event input module 410, the scroll determination module 420, the scroll control module 430, or the content control module 440) included in the electronic device 300 of FIG. 4.

Referring to FIG. 8B, in operation 810, the electronic device 300 may identify whether a type of touch information detected while the first screen 800 is displayed on the display panel 311 of the display module 310 is the touch down.

When the touch information corresponds to the touch down on the basis of the identification result of operation 810 (Yes of operation 810), the electronic device 300 may identify whether a point of the touch down 801 is an area including a touch listener (or a listener associated with a user input) (for example, a click listener or a press listener) within the first screen 800 in operation 812. When an object configured as the touch listener (or the listener associated with the user input) is arranged in the point of the touch down 801 on the basis of the identification result of operation 812 (Yes of operation 812), the electronic device 300 may identify that the point of the touch down 801 corresponds to the selection input area and configure the selection input area item as true in operation 820. When the object configured as the touch listener (or the listener associated with the user input) is not arranged in the point of the touch down 801 on the basis of the identification result of operation 812 (No of operation 812), the electronic device 300 may identify whether the point of the touch down 801 is an area including an element which can be selected by the user within the first screen 800 in operation 814. The selectable element may be an element which can be selected within the first screen 800 such as an image, a video clip, an anchor, or a form. When the selectable element is arranged in the point of the touch down 801 on the basis of the identification result of operation 814 (Yes of operation 814), the electronic device 300 may identify that the point of the touch down 801 corresponds to the selection input area and configure the selection input area item as true in operation 820. When the selection input area item is configured as true, the electronic device 300 may configure the touch slop as a value larger zero (or a default value) than and identify whether a touch movement detected thereafter is an input for the scroll or an input for selecting a specific element. When the selectable element is not arranged in the point of the touch down 801 on the basis of the identification result of operation 814 (No of operation 814), the electronic device 300 may identify whether the element in the point of the touch down 801 within the first screen 800 includes a parent element in operation 816. The parent element may be a higher element surrounding the view of the element. When there is no parent element on the basis of the identification result of operation 816 (No of operation 816), the electronic device 300 may identify that the point of the touch down 801 does not correspond to the selection input area and configure the selection input area item as false in operation 822. When the selection input area item is configured as false, the electronic device 300 may configure the touch slop as zero and initiate the scroll immediately without identifying the touch slop for touch movements detected thereafter. When there is the parent element on the basis of the identification result of operation 816 (Yes of operation 816), the electronic device 300 may identify whether the parent element corresponds to the selection input area in operation 818. The electronic device 300 may identify whether the parent element corresponds to the selection input area within the first screen 800 in the same way (for example, operations 812 to 816) in operation 818.

When the touch information does not correspond to the touch down on the basis of the identification result of operation 810 (No of operation 810), the electronic device 300 may additionally identify whether the touch information corresponds to the touch movement in operation 830. When the touch information corresponds to the touch movement on the basis of the identification result of operation 830 (Yes of operation 830), the electronic device 300 may identify whether the touch movement is an input for selecting a specific element in operation 832. For example, the electronic device 300 may identify whether the movement distance by the touch movement is within the touch slop and/or whether the point in which the touch movement is detected corresponds to the selection input area. When the two conditions are all satisfied on the basis of the identification result of operation 832 (Yes of operation 832), the electronic device 300 may determine and process that the touch movement is the touch input intending the selection by the user. When the two conditions are all not satisfied on the basis of the identification result of operation 832 (No of operation 832), the electronic device 300 may determine that the touch movement is the scroll input for the first screen 800 and perform the scroll for the first screen 800 in operation 834.

When the touch information does not correspond to the touch movement on the basis of the operation 830 (No of operation 830), the electronic device 300 may identify that the touch information is related to touch release and determine and process that the touch event ends.

Figure 9:
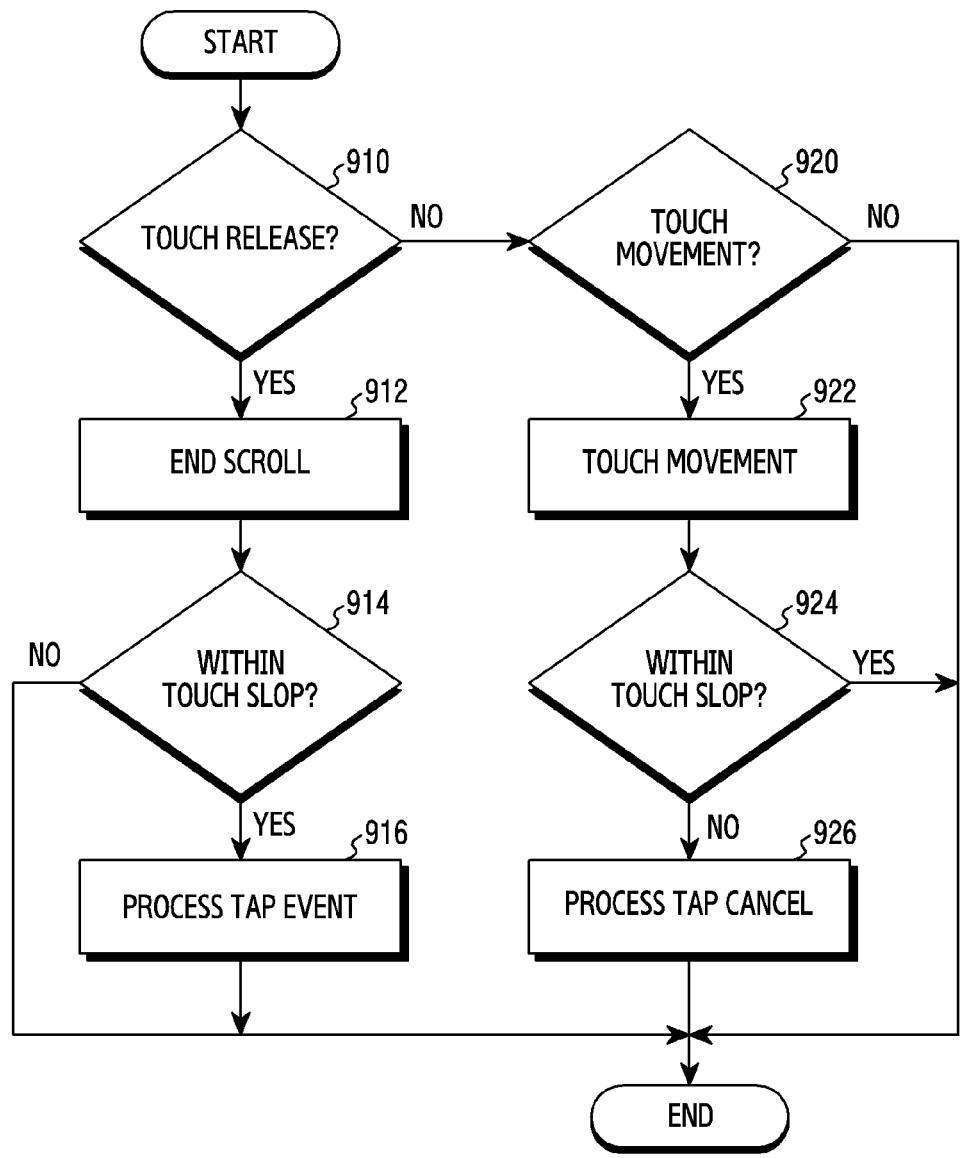
FIG. 9 illustrates a flowchart of a method for processing touch information detected in a scroll area according to an embodiment.

FIG. 9 illustrates a scheme for processing touch information detected in a scroll area according to an embodiment. According to various embodiments, the electronic device 300 may determine whether touch information detected in the scroll area on the display panel (for example, the display module 160 of FIG. 1 or the display panel 311 of FIG. 3) is an input for the scroll or an input for selecting a specific element. The scroll area may be an area identified to have the scroll frequency generated on the display panel 311. The operations of FIG. 9 may be performed by at least one processor (for example, the processor 120 of FIG. 1 or at least one processor 320 of FIG. 3), a touch sensor control circuit (for example, the touch sensor control circuit 313 of FIG. 3), and/or modules (for example, the scroll determination module 420 and/or the scroll control module 430) included in the electronic device 300 of FIG. 4.

Referring to FIG. 9, in operation 910, the electronic device 300 may identify whether a type of the touch information is touch release in response to the detection of the touch information in the scroll area.

When the touch information corresponds to the touch release on the basis of the identification result of operation 910, the electronic device 300 may determine to end the scroll for the first screen in operation 912, and identify whether a movement distance detected when the touch release is performed is within the touch slop in operation 914. When the movement distance is within the touch slop on the basis of the identification result of operation 914 (Yes of operation 914), the electronic device 300 may recognize that the detected touch information is an input for selecting an object or an element within the first screen and process the same as a tap event in operation 916. When the movement distance exceeds the touch slop on the basis of the identification result of operation 914 (No of operation 914), the electronic device 300 may end determination of the touch information without processing the touch information as the tap event.

When the touch information does not correspond to the touch release on the basis of the identification result of operation 910 (No of operation 910), the electronic device 300 may additionally identify whether the touch information corresponds to the touch movement in operation 920. When the touch information corresponds to the touch movement on the basis of the identification result of operation 920 (Yes of operation 920), the electronic device 300 may perform the scroll for the first screen in operation 922, and identify whether the movement distance by the touch movement is within the touch slop in operation 924. At this time, the electronic device 300 may increase a reaction speed for the touch event by performing operation 924 after operation 922. When the movement distance exceeds the touch slop on the basis of the identification result of operation 924 (No of operation 924), the electronic device 300 may recognize that the detected touch information is an input for scrolling the first screen and process tap cancel. When the movement distance is within the touch slop on the basis of the identification result of operation 924 (Yes of operation 924), the electronic device 300 may end the determination of the touch information without processing the touch information as the tap cancel.

When the touch information does not correspond to the touch movement on the basis of the identification result of operation 920 (No of operation 920), the electronic device 300 may end the determination of the touch information without performing any operation.

Figure 10A:
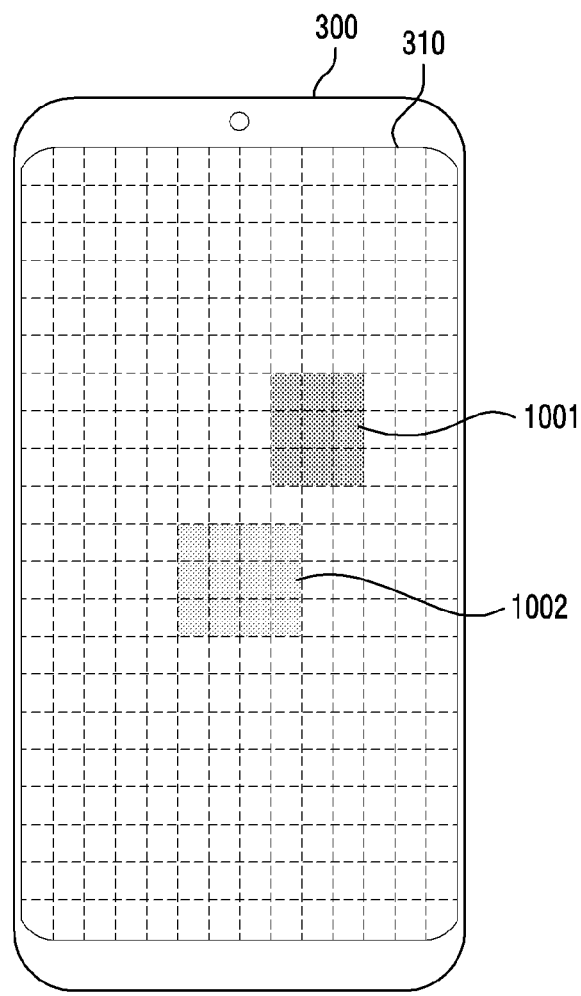
FIGS. 10A and 10B illustrate a scheme for processing a scroll in consideration of a user touch pattern according to an embodiment.
Figure 10B:
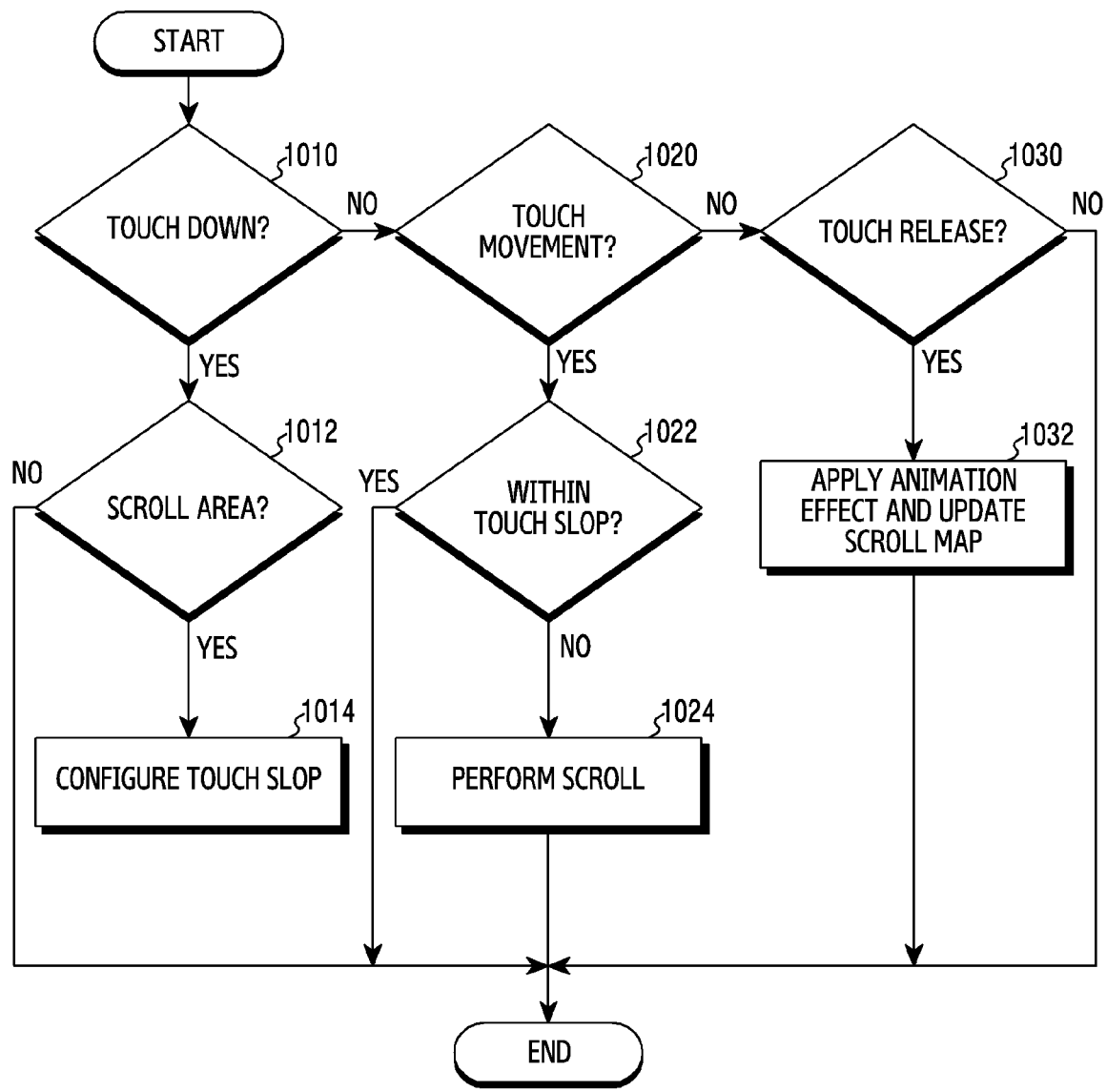

FIGS. 10A and 10B illustrate a scheme for processing the scroll in consideration of a touch pattern of the user according to an embodiment.

According to various embodiments, the electronic device 300 may divide the display panel 311 included in the display module 310 into a plurality of areas and record a touch pattern for each of the divided areas. For example, the electronic device 300 may accumulate the number of scroll generations identified for each of the plurality of areas to calculate a scroll generation probability for each area, and generate a scroll map on the basis of the calculated scroll generation probability for each area as illustrated in FIG. 10A. For example, the electronic device 300 may define and manage an area in which an upward scroll is frequently generated on the display panel 311 as a first scroll area 1001 and an area in which a downward scroll is frequently generated on the display panel 311 as a second scroll area 1002. The electronic device 300 may ignore the touch slop with respect to touch information detected in the first scroll area 1001 or the second scroll area 1002 or decrease the configuration value, so as to more rapidly process the scroll. For example, the electronic device 300 may determine a constant K which is proportional to the scroll generation probability of the first scroll area 1001 or the second scroll area 1002 and divide the default value of the touch slop by the determined constant K to configure the touch slop. The constant K is a natural number larger than 1, and, as the scroll generation probability in the touch down point is higher, a value closer to zero may be configured as the touch slop. In an embodiment, when the touch slop is ignored or the configuration value is decreased, the electronic device 300 may determine that even touch information intended as the selection input by the user exceeds the touch slop and does not process the touch information as the selection operation, which causes a malfunction. In order to prevent the malfunction, for touch information detected in the first scroll area 1001 or the second scroll area 1002, the electronic device 300 may perform the operations of FIG. 9 and thus enable tap event processing during the scroll.

According to various embodiments, the electronic device 300 may define an area having a significantly low scroll generation probability among a plurality of areas defined on the display panel 311 as a selection input processing area. The electronic device 300 may predict the selection for the touch information detected in the selection input processing area as the intended touch input. In this case, the electronic device 300 may access in advance preprocessing work (for example, a domain name system (DNS)) for a link arranged in a point in which the touch information is detected and perform IP address acquisition of the corresponding link, TCP handshaking, or prefetching operation.

According to various embodiments, the process of determining the touch information by using the scroll map is described with reference to FIG. 10B. The operations of FIG. 10B may be performed by at least one processor (for example, the processor 120 of FIG. 1 or at least one processor 320 of FIG. 3), a touch sensor control circuit (for example, the touch sensor control circuit 313 of FIG. 3), and/or modules (for example, the touch event input module 410, the scroll determination module 420, the scroll control module 430, or the content control module 440) included in the electronic device 300 of FIG. 4.

Referring to FIG. 10B, in operation 1010, the electronic device 300 may identify whether a type of touch information detected through the display module 310 is touch down.

When the touch information corresponds to the touch down on the basis of the identification result of operation 1010 (Yes of operation 1010), the electronic device 300 may identify whether the touch down point corresponds to a scroll area defined in the scroll map in operation 1012. When the touch down point corresponds to the scroll area on the basis of the identification result of operation 1012 (Yes of operation 1012), the electronic device 300 may reconfigure the touch slop on the basis of the scroll generation probability of the scroll area in operation 1014. For example, the electronic device 300 may determine a constant K corresponding to the scroll generation probability of the scroll area, divide the default value of the touch slop by the determined constant K, and reconfigure the touch slop, so as to decrease the touch slop of the corresponding scroll area. When the touch down point does not correspond to the scroll area on the basis of the identification result of operation 1012 (No of operation 1012), the electronic device 300 may maintain the default value (or the initial state) without reconfiguring the touch slop.

When the touch information does not correspond to the touch down on the basis of the identification result of operation 1010 (No of operation 1010), the electronic device 300 may identify whether the touch information corresponds to a touch movement in operation 1020. When the touch information corresponds to the touch movement on the basis of the identification result of operation 1020 (Yes of operation 1020), the electronic device 300 may identify whether a movement distance by the touch movement is within the touch slop in operation 1022. When the movement distance exceeds the touch slop on the basis of the identification result of operation 1022 (No of operation 1022), the electronic device 300 may perform the scroll corresponding to the touch movement in operation 1024. When the movement distance is within the touch slop on the basis of the identification result of operation 1022 (Yes of operation 1022), the electronic device 300 may process the scroll corresponding to the touch movement to be not performed.

When the touch information does not correspond to the touch movement on the basis of the identification result of operation 1020 (No of operation 1020), the electronic device 300 may identify whether the touch information corresponds to touch release in operation 1030. When the touch information corresponds to the touch release on the basis of the identification result of operation 1030 (Yes of operation 1030), the electronic device 300 may apply an animation effect related to the scroll on the basis of the touch release and update the scroll map in operation 1032. The update of the scroll map may be performed at every time point at which the touch event ends. When the touch information does not correspond to the touch release on the basis of the identification result of operation 1030 (No of operation 1030), the electronic device 300 may process the touch information to be ignored without performing any operation corresponding to the touch information.

Figure 11:
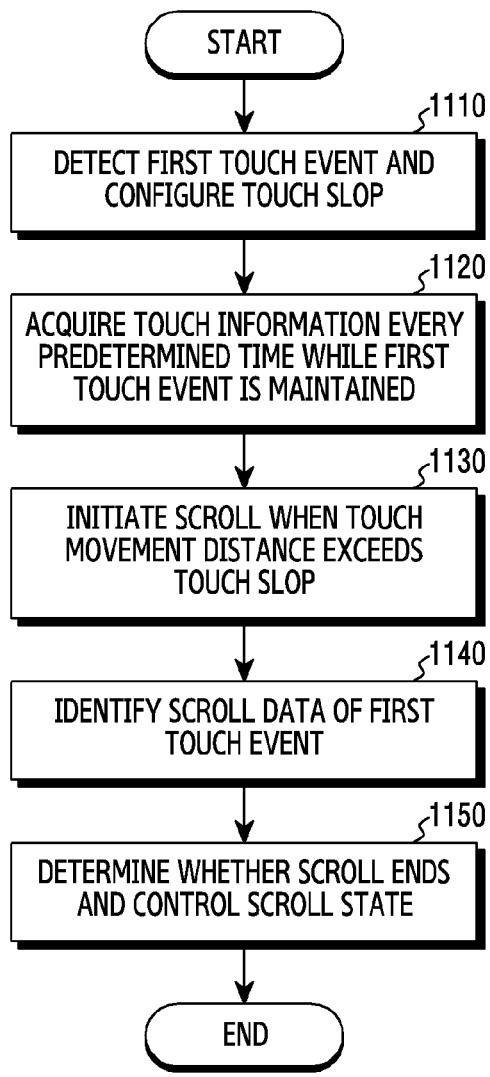
FIG. 11 is a flowchart illustrating a method of operating the electronic device according to an embodiment.

FIG. 11 is a flowchart illustrating a method of operating the electronic device according to an embodiment. According to an embodiment, the electronic device 300 is a device for determining in advance a user's intent on the basis of a touch event and controlling a scroll state and may correspond to the electronic device 101 illustrated in FIG. 1 or the electronic device 300 illustrated in FIG. 3. The operations of FIG. 11 may be performed by at least one processor (for example, the processor 120 of FIG. 1 or at least one processor 320 of FIG. 3) included in the electronic device 300 or a touch sensor control circuit (for example, the touch sensor control circuit 313 of FIG. 3).

Referring to FIG. 11, in operation 1110, the electronic device 300 may detect a first touch event while a first screen is displayed through a display panel (for example, the display module 160 of FIG. 1) or the display panel 311 of FIG. 3) and configure a touch slop that is a minimum movement distance corresponding to the reference for generating the scroll. The touch event is a touch gesture input by the user and may be divided into touch down, touch move, and touch release operations. According to various embodiments, the electronic device 300 may recognize that the touch event is maintained until the touch is released after the touch down is generated, and continuously identify a degree and a direction of movement of a touch point while the touch event is maintained.

According to various embodiments, the electronic device 300 may configure the touch slop as various values according to the location at which the touch down is detected in operation 1110. For example, the electronic device 300 may identify whether the touch down point of the touch event corresponds to a selection input area within the first screen displayed through the display panel 311 and configure the touch slop on the basis of the identification result. The selection input area may be an area including an object configured as a touch listener (or a listener associated with a user input) (for example, a click listener or a press listener), or elements which can be selected by the user such as an image, a video clip, an anchor, and a form within the first screen. When the touch down point corresponds to the object or the element which can be selected by the user or when a parent element of the element selected by the touch down corresponds to the object or the element which can be selected by the user, the electronic device 300 may identify that the touch down point corresponds to the selection input area. When the touch down point does not correspond to the selection input area within the first screen, there is not selectable element in the touch down point, and thus the electronic device 300 may configure the touch slop as zero and process the scroll to be initiated immediately without identifying the touch slop when the touch movement is detected. When it is identified that the touch down point corresponds to the selection input area within the first screen, the electronic device 300 may configure the touch slop as a value larger than zero and identify whether the touch movement detected thereafter is an input for the scroll or an input for selecting a specific element. In this case, when the detected touch movement distance is shorter than the configured touch slop, the electronic device 300 may determine the touch movement is the input for selecting the specific element. In contrast, when the detected touch movement distance is longer than the configured touch slop, the electronic device 300 may determine that the touch movement is the scroll input and perform the scroll according to the touch movement distance.

In another example, the electronic device 300 may identify whether the touch down point of the touch event corresponds to a scroll area on the basis of a scroll map having a defined scroll pattern of the user and configure the touch slop on the basis of the identification result. The electronic device 300 may store a scroll generation probability of each of a plurality of areas included in the display panel 311 of the display module 310 and a scroll map defining a scroll area in which the scroll is generated with a high probability in the memory (for example, the memory 130 of FIG. 1 or the memory 330 of FIG. 3) and manage the same. When detecting the touch down of the touch event, the electronic device 300 may load the scroll map from the memory 330 and identify whether the scroll generation probability of the touch down point or the touch down point corresponds to the scroll area. When identifying that the touch down point corresponds to the scroll area, the electronic device 300 may configure the touch slop on the basis of the scroll generation probability of the touch down point. For example, the electronic device 300 may determine a constant K which is proportional to the scroll generation probability and divide the default value of the touch slop by the constant K, so as to configure the touch slop. Accordingly, as the scroll generation probability of the touch down point is higher, a value closer to zero may be configured as the touch slop. When the touch down point does not correspond to the scroll area, the electronic device 300 may determine whether to perform the scroll on the basis of the default value without any change in the configuration for the touch slop.

According to an embodiment, in operation 1120, the electronic device 300 may acquire touch information associated with the current touch point every predetermined time while the touch event is maintained. The touch information may include at least one of coordinates of the point in which the touch is detected while the touch event is maintained, a movement speed or a movement distance calculated on the basis of the current touch point, or a deceleration. The predetermined time may correspond to a screen refresh rate of the display panel 311. For example, when the screen refresh rate of the display panel 311 is 60 Hz, the electronic device 300 may acquire the touch information every 16 ms. In another example, when the screen refresh rate of the display panel 311 is 120 Hz, the electronic device 300 may acquire the touch information every 8 ms.

According to an embodiment, in operation 1130, the electronic device 300 may identify whether the touch movement distance exceeds the configured touch slop on the basis of the acquired touch information. When the touch movement distance does not exceed the touch slop on the basis of the identification result, the electronic device 300 may not perform the scroll for the first screen until the touch movement exceeding the touch slop is detected. When the touch movement distance exceeds the touch slop on the basis of the identification result, the electronic device 300 may control the display module 310 to initiate the scroll for the first screen according to the touch movement.

According to an embodiment, in operation 1140, the electronic device 300 may identify scroll data including at least one of a movement speed, a movement distance, or deceleration of the touch event on the basis of the touch information acquired while the scroll for the first screen is performed. For example, the electronic device 300 may acquire coordinate information of points in which touch movements are detected every predetermined time while the scroll is performed and calculate at least one of a movement speed, a movement distance, or deceleration for each scroll interval on the basis of the acquired coordinate information. The scroll interval may correspond to the predetermined time that is a time period during which the touch information is acquired.

According to an embodiment, in operation 1150, the electronic device 300 may determine whether to end the scroll on the basis of the scroll data. For example, the electronic device 300 may identify the movement distance of the scroll interval corresponding to the current touch movement point on the basis of the scroll data and compare the identified movement distance with a first threshold value. The first threshold value may indicate a minimum touch movement size for continuing the scroll. When the identified movement distance is shorter than the first threshold value on the basis of the comparison result, the electronic device 300 may additionally identify whether the state of the scroll is changed. The electronic device 300 may identify a first scroll interval having the longest touch movement distance while the scroll for the first screen is performed on the basis of the touch information and calculate deceleration in the current touch movement point on the basis of the first scroll interval. The electronic device 300 may identify a user's intent about whether to continue the scroll through a comparison operation between the calculated deceleration and a second threshold value. The second threshold value may indicate a deceleration value defined on the basis of the reference for determining a scroll stop interval. When the calculated deceleration is larger than the second threshold value on the basis of the comparison result, the electronic device 300 may determine that the user has an intent to stop the scroll and control the display module 310 to stop the scroll for the first screen.

According to various embodiments, the electronic device 300 may determine the user's intent on the basis of touch movement distances measured in the scroll intervals without deceleration measurement in a low-speed scroll condition. When the user slowly performs a touch movement and a scroll, a difference in the touch movement distance between the first scroll interval and another scroll interval is not large, and thus the scroll may be frequently stopped. In order to prevent the same, the electronic device 300 may count scroll intervals of which the movement distance identified on the basis of the touch information while the scroll for the first screen is performed is shorter than the first threshold value. Based on a determination that the number of counted scroll intervals is larger than a third threshold value, the electronic device 300 may determine that the user has the intent to stop the scroll and control the display module 310 to stop the scroll. The third threshold value is the reference number for determining the user's intent to stop the scroll and may be predefined. The electronic device 300 may additionally identify scroll intervals of which the identified movement distance is longer than the first threshold value while the scroll intervals shorter than the first threshold value are counted. Based on a determination that the scroll intervals longer than the first threshold value exceed a fourth threshold value, the electronic device 300 may determine the user's intent to continue the scroll and reset the count as zero. The fourth threshold value is the reference number for determining the user's intent to continue to perform the scroll and may be predefined.

After operation 1150, the electronic device 300 may detect touch release of the touch event. The electronic device 300 may identify a state of the scroll for the first screen in response to the detection of the touch release and determine whether to apply an animation effect related to the scroll on the basis of the identified state. For example, when the touch release is detected in the state in which the scroll for the first screen is performed, the electronic device 300 may determine a generation speed of an animation effect (for example, fling) to be applied right before the end of the scroll on the basis of the recent scroll speed (for example, an average movement speed of a predetermined number of scroll intervals on the basis of the touch release time point). In another example, when the touch release is detected in the state in which the scroll for the first screen is stopped, the electronic device 300 may determine that the user has the intent to stop the scroll for the first screen. In this case, the electronic device 300 may determine the generation speed of the animation effect as zero and process the touch event to end immediately without applying the animation effect to the scroll in the state in which the scroll is stopped.

An electronic device (for example, the electronic device 300) according to an embodiment may include a display module (for example, the display module 310), at least one processor (for example, the processor 320) operatively connected to the display module, and a memory (for example, the memory 330) operatively connected to the at least one processor, wherein the memory may be configured to store instructions causing the at least one processor to, when executed, configure a touch slop corresponding to a reference for performing a scroll in response to detection of a first touch event, acquire touch information corresponding to a current touch point every predetermined time while the first touch event is maintained, based on a determination that a touch movement distance exceeds the touch slop, based on the acquired touch information, initiate a scroll for a first screen displayed on the display module, identify scroll data including at least one of a movement speed, a movement distance, or deceleration of the first touch event, based on the touch information acquired while the scroll is performed, and determine whether to end the scroll, based on the scroll data to control a state of the scroll for the first screen.

In an embodiment, the instructions may cause the at least one processor to identify whether a touch down point of the first touch event corresponds to a selection input area within the first screen in response to the detection of the first touch event and configure the touch slop, based on a result of the identification.

In an embodiment, the instructions may cause the at least one processor to configure the touch slop as zero based on a determination that the touch down point does not correspond to the selection input area and configure the touch slop as a value larger than zero based on a determination that the touch down point corresponds to the selection input area.

In an embodiment, the instructions may cause the at least one processor to identify a movement distance for each scroll interval while the scroll for the first screen is performed based on the touch information and change the state of the scroll when the identified movement distance is shorter than the first threshold value, and the scroll interval is configured to correspond to the predetermined time.

In an embodiment, the instructions may cause the at least one processor to identify a first scroll interval having a longest movement distance while the scroll for the first screen is performed based on the touch information, calculate current deceleration, based on the first scroll interval, and stop the scroll when the calculated deceleration is larger than a second threshold value.

In an embodiment, the instructions may cause the at least one processor to count scroll intervals of which the identified movement distance is shorter than the first threshold value while the scroll for the first screen is performed and stop the scroll when the number of counted scroll intervals is larger than a third threshold value.

In an embodiment, the instructions may cause the at least one processor to reset the count when scroll intervals longer than the first threshold value exceeds a fourth threshold value while the scroll intervals having the movement distance shorter than the first threshold value are counted.

In an embodiment, the instructions may cause the at least one processor to identify a movement speed for each scroll interval while the scroll for the first screen is performed based on the touch information and change the first threshold value to a value smaller than a predetermined value when an average speed calculated based on the identified movement speed is equal to or lower than a predetermined speed.

In an embodiment, the instructions may cause the at least one processor to identify a scroll map stored in the memory in response to detection of the first touch event, identify whether a touch down point of the first touch event corresponds to a scroll area within the display module, based on the scroll map, and configure the touch slop, based on a scroll generation probability of the touch down point when the touch down point corresponds to the scroll area, and the scroll map includes scroll generation probabilities for a plurality of areas included in the display module and scroll area-related information determined based on the scroll generation probability of each of the plurality of areas.

In an embodiment, the instructions may cause the at least one processor to identify a scroll control state for the first screen when touch release of the first touch event is detected, determine a generation speed of an animation effect related to the scroll, based on the identified control state, and process that the first touch event has end.

A method of operating an electronic device (for example, the electronic device 300) according to another embodiment may include an operation of configuring a touch slop corresponding to a reference for performing a scroll in response to detection of a first touch event, an operation of acquiring touch information corresponding to a current touch point every predetermined time while the first touch event is maintained, an operation of, based on a determination that a touch movement distance exceeds the touch slop, based on the acquired touch information, initiating a scroll for a first screen displayed on the display module (for example, the display module 310), an operation of identifying scroll data including at least one of a movement speed, a movement distance, or deceleration of the first touch event, based on the touch information acquired while the scroll is performed, and an operation of determining whether to end the scroll, based on the scroll data to control a state of the scroll for the first screen.

In an embodiment, the operation of configuring the touch slop may include an operation of identifying a touch down point of the first touch event corresponds to a selection input area within the first screen in response to the detection of the first touch event and an operation of configuring the touch slop, based on a result of the identification.

In an embodiment, the operation of configuring the touch slop may include an operation of, based on a determination that the touch down point does not correspond to the selection input area, configuring the touch slop as zero and an operation of, based on a determination that the touch down point corresponds to the selection input area, configuring the touch slop as a value larger than zero.

In an embodiment, the operation of controlling the state of the scroll for the first screen may include an operation of identifying a movement distance for each scroll interval while the scroll for the first screen is performed based on the touch information and an operation of when the identified movement distance is shorter than a first threshold value, performing control to change the state of the scroll, and the scroll interval may be configured to correspond to the predetermined time.

In an embodiment, the operation of controlling the state of the scroll for the first screen may include an operation of identifying a first scroll interval having a longest movement distance while the scroll for the first screen is performed based on the touch information, an operation of calculating current deceleration, based on the first scroll interval, and an operation of, when the calculated deceleration is larger than a second threshold value, performing control to stop the scroll.

In an embodiment, the operation of controlling the state of the scroll for the first screen may further include an operation of counting scroll intervals of which the identified movement distance is shorter than the first threshold value while the scroll for the first screen is performed and an operation of, when the number of counted scroll intervals is larger than a third threshold value, performing control to stop the scroll.

In an embodiment, the operation of controlling the state of the scroll for the first screen may further include an operation of resetting the count when scroll intervals longer than the first threshold value exceeds a fourth threshold value while the scroll intervals having the movement distance shorter than the first threshold value are counted.

In an embodiment, the method may further include an operation of identifying a movement speed for each scroll interval while the scroll for the first screen is performed based on the touch information and an operation of, when an average speed calculated based on the identified movement speed is equal to or lower than a predetermined speed, changing the first threshold value to a value smaller than a predetermined value.

In an embodiment, the operation of configuring the touch slop may include an operation of identifying a scroll map stored in the memory in response to detection of the first touch event, an operation of identifying whether a touch down point of the first touch event corresponds to a scroll area within the display module, based on the scroll map, and an operation of configuring the touch slop, based on a scroll generation probability of the touch down point when the touch down point corresponds to the scroll area, and the scroll map may include scroll generation probabilities for a plurality of areas included in the display module and scroll area-related information determined based on the scroll generation probability of each of the plurality of areas.

In an embodiment, the method may further include an operation of, when touch release of the first touch event is detected, identifying a scroll control state for the first screen and an operation of determining a generation speed of an animation effect related to the scroll, based on the identified control state and processing that the first touch event has end.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display module;
at least one processor; and
memory storing instructions that, when executed by the at least one processor, cause the electronic device to:
detect a touch down point of a first touch event on a screen of the display module;
identify whether the touch down point of the first touch event is within a first area comprising at least one object selectable by a touch within the screen or a second area without at least one object selected by a touch, wherein the second area is outside of the first area;
in case that the touch down point is within the second area, configure a threshold value a first value;
in case that the touch down point is within the first area, configure the threshold value as a second value that is greater than the first value;
detect a touch movement distance from the touch down point; and
when the touch movement distance of the first touch event exceeds the threshold value, perform a scroll for the screen.

2. The electronic device of claim 1, wherein the instructions, when executed by the at least one processor, further cause the electronic device to:
acquire touch information corresponding to a current touch point of the first touch event at each predetermined time while the first touch event is maintained;
identify scroll data comprising at least one of a movement speed, a movement distance, or deceleration of the first touch event, based on the touch information acquired while the scroll is performed; and
determine whether to end the scroll, based on the scroll data to control a state of the scroll for the screen.

3. The electronic device of claim 2, wherein the instructions, when executed by the at least one processor, further cause the electronic device to:
identify a movement distance for each scroll interval while the scroll for the screen is performed based on the touch information; and
change the state of the scroll based on a determination that the identified movement distance is shorter than a first threshold value, and wherein the scroll interval is configured to correspond to the predetermined time.

4. The electronic device of claim 3, wherein the instructions, when executed by the at least one processor, further cause the electronic device to:
identify a first scroll interval having a longest movement distance while the scroll for the screen is performed based on the touch information;
calculate a current deceleration, based on the first scroll interval; and
stop the scroll based on a determination that the calculated deceleration is larger than a second threshold value.

5. The electronic device of claim 3, wherein the instructions, when executed by the at least one processor, further cause the electronic device to:
count a number of scroll intervals of which the identified movement distance is shorter than the first threshold value while the scroll for the screen is performed; and
stop the scroll based on a determination that the number of counted scroll intervals is larger than a third threshold value.

6. The electronic device of claim 5, wherein the instructions, when executed by the at least one processor, further cause the electronic device to reset the number of scroll intervals based on a determination that a number of scroll intervals longer than the first threshold value exceeds a fourth threshold value while the scroll intervals having the movement distance shorter than the first threshold value are counted.

7. The electronic device of claim 3, wherein the instructions, when executed by the at least one processor, further cause the electronic device to:
identify a movement speed for each scroll interval while the scroll for the screen is performed based on the touch information; and
change the first threshold value to a value smaller than a predetermined value based on a determination that an average speed calculated based on the identified movement speed is equal to or lower than a predetermined speed.

8. The electronic device of claim 1, wherein the instructions, when executed by the at least one processor, further cause the electronic device to:
identify a scroll map stored in the memory in response to detection of the first touch event;
identify whether a touch down point of the first touch event corresponds to a scroll area within the display module, based on the scroll map; and
configure the threshold value, based on a scroll generation probability of the touch down point in case that the touch down point corresponds to the scroll area, and
wherein the scroll map comprises scroll generation probabilities for a plurality of areas included in the display module and scroll area-related information determined based on the scroll generation probability of each of the plurality of areas.

9. The electronic device of claim 1, wherein the instructions, when executed by the at least one processor, further cause the electronic device to:
identify a scroll control state for the screen in case that touch release of the first touch event is detected;
determine a generation speed of an animation effect related to the scroll, based on the identified control state; and
process that the first touch event has end.

10. A method of operating an electronic device, the method comprising:

detecting a touch down point of a first touch event on a screen of a display module;
identifying whether the touch down point of the first touch event is within a first area comprising at least one object selectable by a touch within the screen or a second area without at least one object selected by a touch, wherein the second area is outside of the first area;
in case that the touch down point is within the second area, configuring a threshold value as a first value;
in case that the touch down point is within the at least area, configuring the threshold value as a second value that is greater than the first value;
detect a touch movement distance from the touch down point; and
when a touch movement distance of the first touch event exceeds the threshold value, performing a scroll for the screen.

11. The method of claim 10, further comprising:
acquiring touch information corresponding to a current touch point of the first touch event at each predetermined time while the first touch event is maintained;
identifying scroll data comprising at least one of a movement speed, a movement distance, or deceleration of the first touch event, based on the touch information acquired while the scroll is performed; and
determining whether to end the scroll, based on the scroll data to control a state of the scroll for the screen.

12. The method of claim 11, wherein the controlling of the state of the scroll for the screen comprises:
identifying a movement distance for each scroll interval while the scroll for the screen is performed based on the touch information; and
based on a determination that the identified movement distance is shorter than a first threshold value, changing the state of the scroll, and
the scroll interval is configured to correspond to the predetermined time.

13. The method of claim 12, wherein the controlling of the state of the scroll for the screen comprises:
identifying a first scroll interval having a longest movement distance while the scroll for the screen is performed based on the touch information;
calculating current deceleration, based on the first scroll interval; and
based on a determination that the calculated deceleration is larger than a second threshold value, stopping the scroll.

14. The method of claim 12, wherein the controlling of the state of the scroll for the screen further comprises:
counting a number of scroll intervals of which the identified movement distance is shorter than the first threshold value while the scroll for the screen is performed; and
based on a determination that the number of counted scroll intervals is larger than a third threshold value, stopping the scroll.

15. The method of claim 14, wherein the controlling of the state of the scroll for the first screen further comprises resetting the number of scroll intervals based on a determination that a number of scroll intervals longer than the first threshold value exceeds a fourth threshold value while the scroll intervals having the movement distance shorter than the first threshold value are counted.

16. The method of claim 12, further comprising:
identifying a movement speed for each scroll interval while the scroll for the screen is performed based on the touch information; and
based on a determination that an average speed calculated based on the identified movement speed is equal to or lower than a predetermined speed, changing the first threshold value to a value smaller than a predetermined value.

17. The method of claim 10, wherein the configuring of the threshold value comprises:
identifying a scroll map in response to detection of the first touch event;
identifying whether a touch down point of the first touch event corresponds to a scroll area within the display module, based on the scroll map; and
configuring the threshold value, based on a scroll generation probability of the touch down point based on a determination that the touch down point corresponds to the scroll area, and
wherein the scroll map comprises scroll generation probabilities for a plurality of areas included in the display module and scroll area-related information determined based on the scroll generation probability of each of the plurality of areas.

18. The method of claim 10, further comprising:
based on a determination that touch release of the first touch event is detected, identifying a scroll control state for the screen; and
determining a generation speed of an animation effect related to the scroll, based on the identified control state and processing that the first touch event has end.

* * * * *